(12) United States Patent
Abotabl et al.

(10) Patent No.: US 11,956,732 B2
(45) Date of Patent: Apr. 9, 2024

(54) AUTONOMOUS PHYSICAL UPLINK SHARED CHANNEL REPETITION CANCELLATION FOR ENERGY-LIMITED DEVICES

(71) Applicant: QUALCOMM Incorporated, San Diego, CA (US)

(72) Inventors: Ahmed Attia Abotabl, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/449,205

(22) Filed: Sep. 28, 2021

(65) Prior Publication Data
US 2023/0098241 A1   Mar. 30, 2023

(51) Int. Cl.
| | |
|---|---|
| H04W 72/21 | (2023.01) |
| H04W 52/24 | (2009.01) |
| H04W 72/044 | (2023.01) |
| H04W 76/18 | (2018.01) |

(52) U.S. Cl.
CPC ....... *H04W 52/242* (2013.01); *H04W 52/241* (2013.01); *H04W 72/0473* (2013.01); *H04W 72/21* (2023.01); *H04W 76/18* (2018.02)

(58) Field of Classification Search
None
See application file for complete search history.

(56) References Cited

U.S. PATENT DOCUMENTS

| | | | | |
|---|---|---|---|---|
| 2011/0092236 A1* | 4/2011 | Iwamura | ............. | H04W 12/106 |
| | | | | 455/507 |
| 2014/0011543 A1* | 1/2014 | Li | ................... | H04W 52/0206 |
| | | | | 455/561 |
| 2015/0303741 A1* | 10/2015 | Malik | .................... | H02J 50/20 |
| | | | | 307/104 |
| 2016/0309390 A1* | 10/2016 | Yi | .......................... | H04W 40/10 |
| 2018/0123744 A1* | 5/2018 | Nogami | .............. | H04W 52/248 |
| 2018/0220373 A1* | 8/2018 | Arzelier | ............ | H04W 52/0241 |
| 2019/0131827 A1* | 5/2019 | Johnston | ............. | H02J 7/00034 |
| 2022/0272739 A1* | 8/2022 | Takahashi | ............. | H04W 72/23 |
| 2022/0346022 A1* | 10/2022 | Butt | .................. | H04W 52/0251 |

* cited by examiner

Primary Examiner — Benjamin Lamont
(74) Attorney, Agent, or Firm — Arent Fox, LLP

(57) ABSTRACT

Apparatus, methods, and computer-readable media for autonomous physical uplink shared channel repetition cancellation for energy-limited devices are disclosed herein. A user equipment (UE) may transmit, to a base station, a plurality of uplink channel repetitions. The UE may determine that a device power level associated with the UE does not exceed a predetermined threshold that corresponds to a power requirement to transmit a number of uplink channel repetition instances in the plurality of uplink channel repetitions. The UE may determine to not transmit the number of uplink channel repetition instances based on the device power level falling below the predetermined threshold. The UE may modify the device power level through an energy harvesting operation. Thus, the power efficiency and reliability of uplink channel repetitions can be increased.

30 Claims, 15 Drawing Sheets

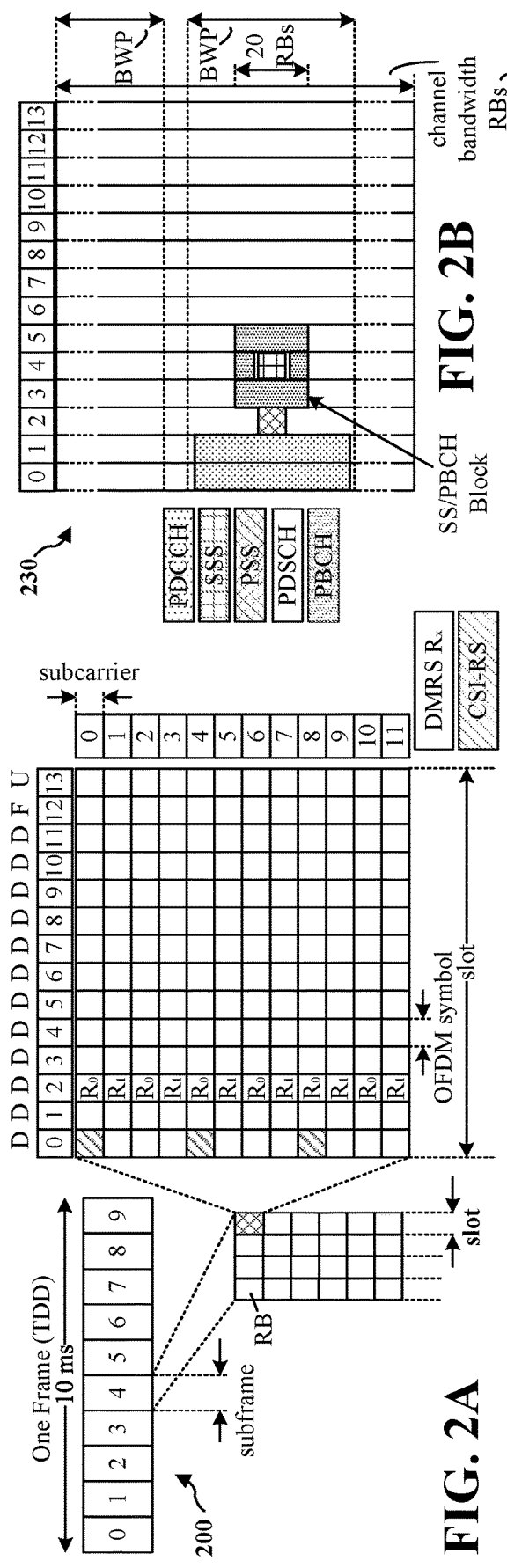
FIG. 2A
FIG. 2B
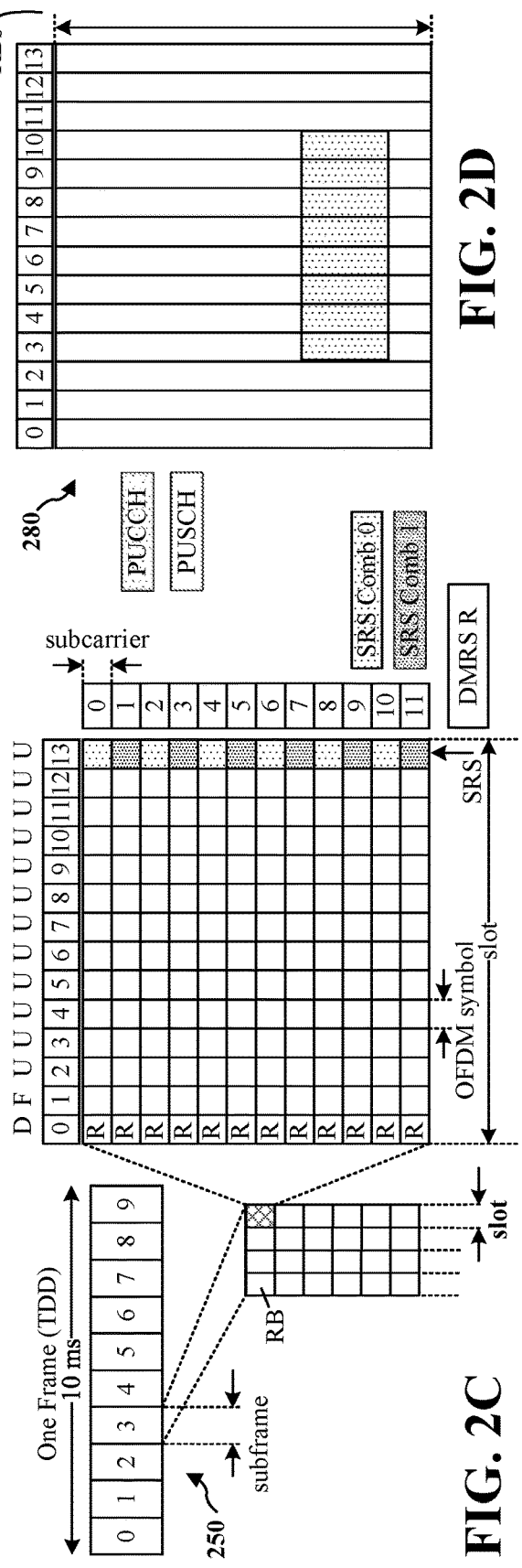
FIG. 2C
FIG. 2D

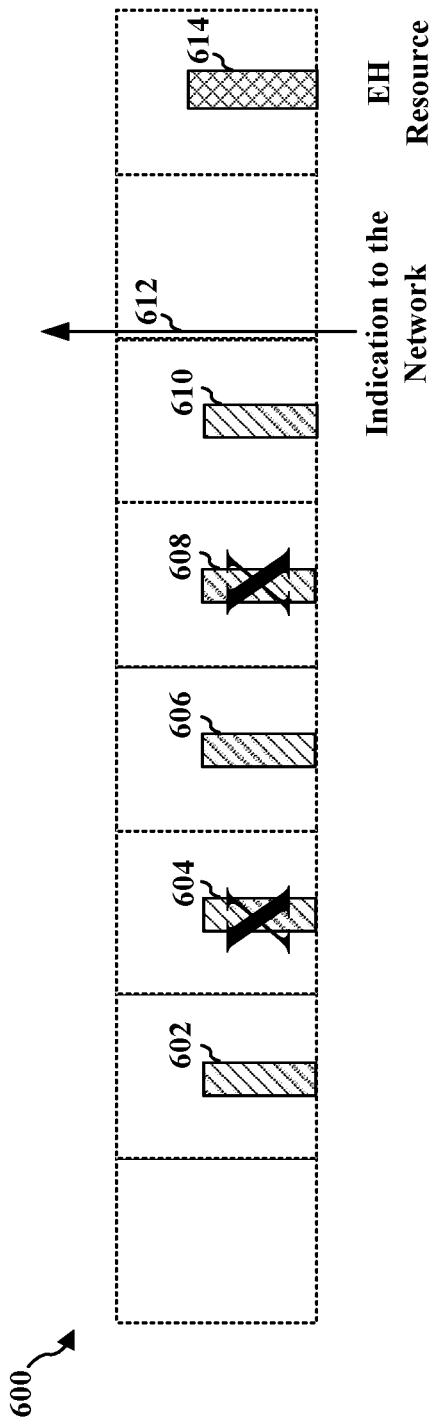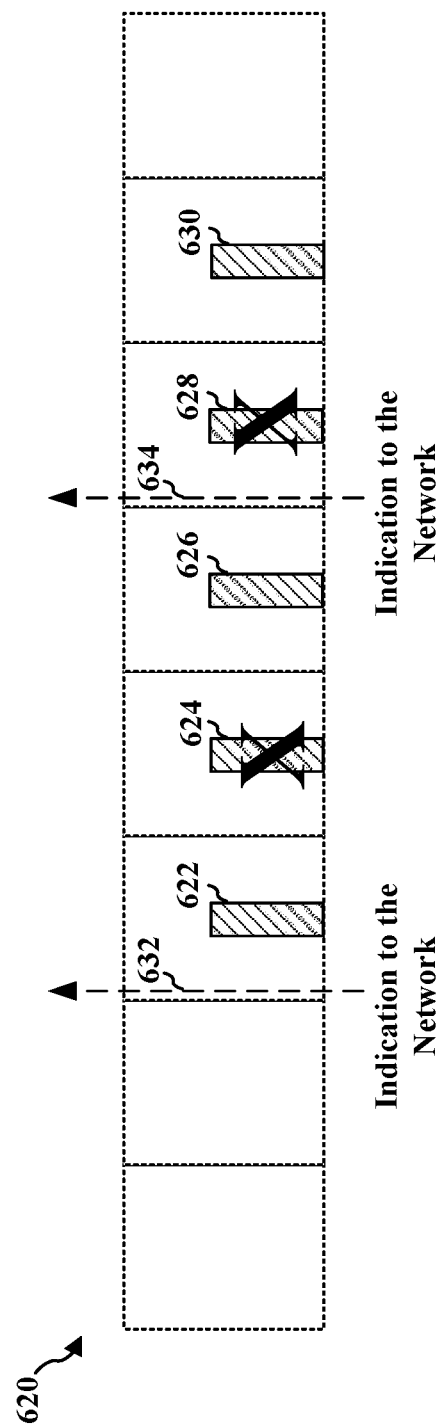

AUTONOMOUS PHYSICAL UPLINK SHARED CHANNEL REPETITION CANCELLATION FOR ENERGY-LIMITED DEVICES

BACKGROUND

Technical Field

The present disclosure relates generally to wireless communication, and more particularly, to techniques for autonomous physical uplink shared channel repetition cancellation for energy-limited devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus is configured to transmit, to a base station, a plurality of uplink channel repetitions. The apparatus is also configured to determine that a device power level associated with the UE does not exceed a predetermined threshold that corresponds to a power requirement to transmit a number of uplink channel repetition instances in the plurality of uplink channel repetitions. The apparatus is also configured to determine to not transmit the number of uplink channel repetition instances based on the device power level falling below the predetermined threshold. The apparatus is also configured to modify the device power level through an energy harvesting operation.

In an aspect of the disclosure, a method, a computer-readable medium, and an apparatus are provided. The apparatus may be a base station. The apparatus is configured to receive, from a UE, a plurality of uplink channel repetitions. The apparatus is also configured to detect a change in a transmission of the plurality of uplink channel repetitions based on an indication associated with at least a portion of the plurality of uplink channel repetitions. The apparatus is also configured to transmit, to the UE, a downlink configuration that configures the UE with one or more energy harvest resources that enables the UE to perform an energy harvesting operation on the one or more energy harvest resources based on the detected change in the transmission of the plurality of uplink channel repetitions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 6A is a diagram illustrating another example of uplink channel repetition transmissions including dropped uplink channel repetition instances and an allocation of energy harvest resources, in accordance with some aspects of the present disclosure.

FIG. 6B is a diagram illustrating another example of uplink channel repetition transmissions including dropped uplink channel repetition instances with multiple indication signals to a network, in accordance with some aspects of the present disclosure.

DETAILED DESCRIPTION

Figure 1:
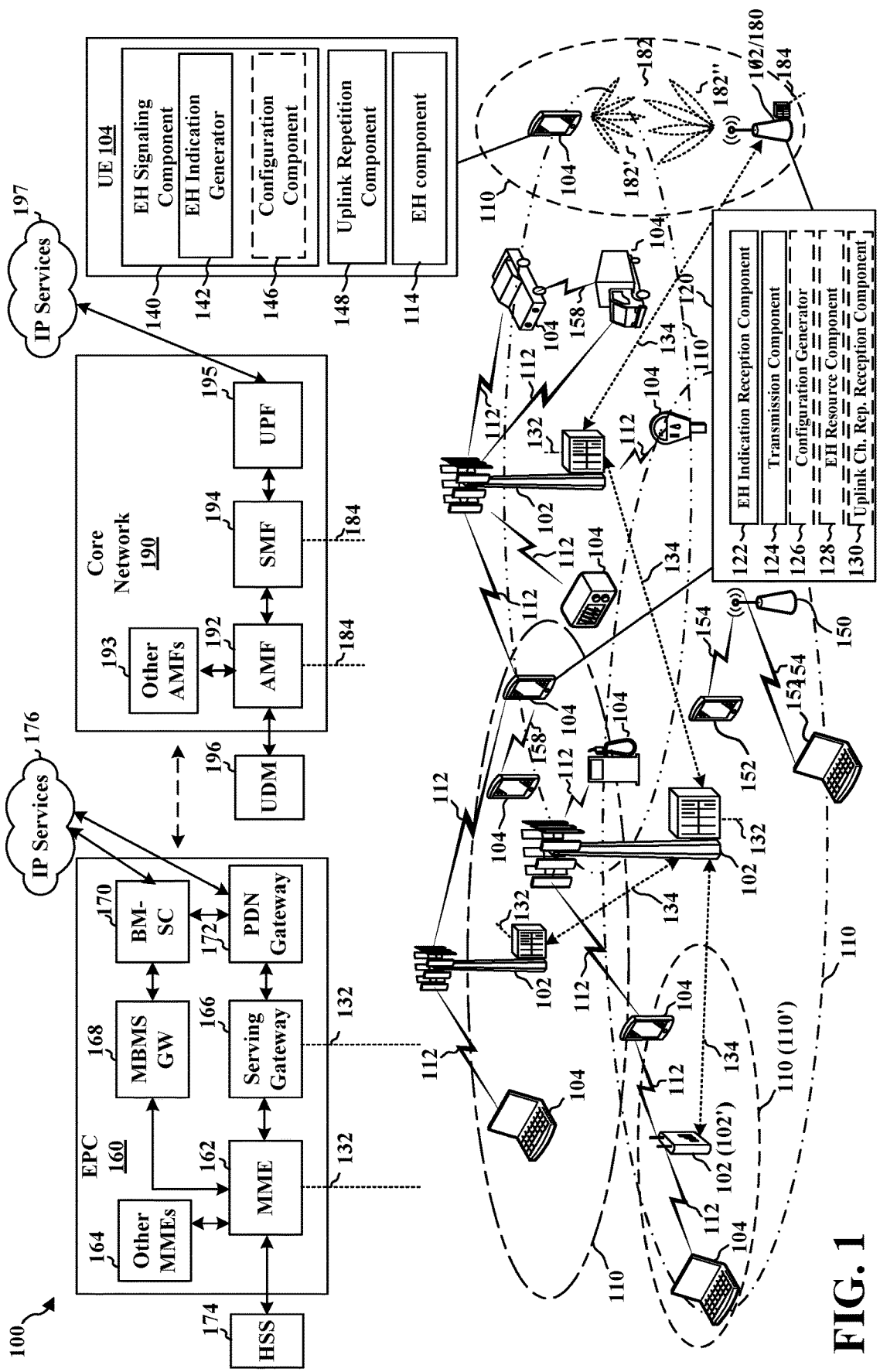
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless communications systems have conventionally focused on improved quality for premium services such as enhanced mobile broad band (eMBB), ultra-reliable low latency communication (URLLC), and vehicle to anything (V2X) services. There is also a need to provide service for reduced capability (RedCap) devices such as wearables, industrial wireless sensor networks, surveillance cameras, and low-end smartphones. For such RedCap devices, metrics such as peak throughput, bandwidth, latency, and reliability may be less important than efficiency and cost improvements. One example service for RedCap devices is low power wide area (LPWA) communications with improvements to coverage with reduced complexity and power consumption. Example use cases for LPWA communications include metering devices, asset tracking, and IoT. One technique to provide reduced power consumption is energy harvesting.

Energy harvesting (EH) may broadly include different physical mechanisms such as solar, thermal, wind, and kinetic. However, unlike these sources, RF sources in a radio frequency (RF) EH scheme may provide controllable and constant energy transfer over distance for RF energy harvesters. In particular, using radio frequency (RF) based energy harvesting, a device may obtain energy from wireless waveforms over the air. In comparison to other physical mechanisms, the RF energy harvesting may be more flexible as an RF signal can be used under various conditions such as indoors, at night, and while stationary. Further, in a fixed RF EH network, the harvested energy may be predictable and relatively stable over time due to fixed distances between devices.

Using a random multipath fading channel model, the energy harvested at a node j from a transmitting node i may be given by:

$$E_j = \eta P_i |g_{i\text{-}j}|^2 \alpha T,$$

where $P_i$ is a transmit power by node i, $g_{i\text{-}j}$ is a channel coefficient of a link between node i and node j, a refers to the fraction of time allocated for energy harvesting (e.g., $0 \leq \alpha \leq 1$), T is a time allocated for EH, and 77 is an RF-to-DC conversion efficiency.

In 5G NR, a UE that is configured to transmit PUSCH with multiple repetitions may be in a state that does not permit all these transmissions due to power requirements. The UE may need to reduce the number of repetitions to save energy, and by halting these PUSCH repetitions, the UE can harvest energy at a charging rate and form an indication of energy harvesting to the network.

The present disclosure provides for autonomous cancellation of PUSCH repetitions depending on associated uplink power requirements. A UE can form uplink signaling, explicit or implicit, to indicate UE-based energy harvesting operations to a network. A UE may be configured with multiple PUSCH repetitions and may decide to stop the repetitions and/or reduce the number of repetitions to conserve energy. The UE may need to harvest energy before the UE can resume transmission of the PUSCH repetitions. Therefore, the UE may drop certain uplink channel repetition transmissions in the middle to allow enough energy harvesting before the transmission of the remaining uplink channel repetition instances. The indication to the network may include a bitmap of the PUSCH resources that are transmitted.

The decision to stop repetitions or to reduce the number of PUSCH repetitions can either be a UE-based decision or the UE can be configured via RRC configuration with a predetermined threshold such that if a device power level of the UE falls below the predetermined threshold, the UE is configured to stop the PUSCH repetitions. The UE may receive a RRC configuration that configures the UE with a relationship between the number of dropped PUSCH repetition instances and an energy harvesting rate of the UE. For example, if the UE requires energy harvesting rate of 0.5, the UE would need to drop two uplink channel repetition instances. If the UE requires a higher energy harvesting rate, the UE may need to drop additional uplink channel repetition transmissions.

In some implementations, the UE may send an explicit indication to the network to either indicate that the UE stopped the PUSCH repetitions or indicate a new number of PUSCH repetitions (e.g., a reduced number due to dropped PUSCH repetitions). This indication can be transmitted either via a UCI or PUSCH transmission. In other implementations, the UE may provide an implicit indication, where the base station can identify the reduced number of uplink channel repetition transmissions through energy detection originating from a direction of the UE, or by performing a correlation between a first uplink channel repetition transmission and a remainder of the uplink channel repetition transmissions.

The UE may be configured with an allocation of energy harvesting resources that are activated if the number of uplink channel repetitions is reduced. The energy harvesting rate in the EH resources can be determined based on the RRC configuration relating to the number of dropped uplink channel repetition transmissions and the preconfigured energy harvesting rate of the UE.

In this regard, the subject technology increases the efficiency and reliability of uplink repetition transmissions by facilitating the stoppage of uplink repetitions when power requirements to transmit a remaining number of uplink repetitions are not met and the UE can perform energy harvesting operations during the stoppage to harvest energy before resuming any transmission of the remaining uplink repetitions.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include an energy harvesting (EH) component 114 for harvesting energy and an EH signaling component 140 for signaling an EH indication signal to a second device (e.g., base station 102). The EH signaling component 140 may include an EH indication generator 142 for generating the EH indication signal that indicates that the UE 104 stopped transmission of uplink channel repetitions and intends to harvest energy before resuming transmission of the uplink channel repetitions. In some implementations, the EH signaling component 140 optionally includes a configuration component 146 configured to receive a configuration message indicating that the UE is to refrain from transmitting any uplink channel repetitions when the device power level of the UE 104 falls below a predetermined threshold. In an aspect, the one or more UEs 104 may include an uplink repetition component 148 for transmitting uplink channel repetition instances to the base station.

In an aspect, one or more transmitting devices (e.g., a base station 102 or another UE 104 transmitting sidelink communications) may include an EH detection component 120 configured to detect either an explicit and/or implicit EH indication from the UE 104. The EH detection component 120 may include an EH indication reception component 122 configured to receive the EH indication signal from the UE 104 indicating the UE 104 has stopped transmission of uplink channel repetitions and intends to harvest energy before resuming the uplink channel repetition transmissions. In some implementations, the EH detection component 120 may monitor for beams from a direction of the UE 104 and detect any energy variations on the beams that are indicative of an implicit EH indication. The EH detection component 120 may include a transmission component 124 configured to transmit an RF signal to the UE 104 or another UE for energy harvesting at the UE 104. The EH detection component 120 may optionally include a configuration generator 126 configured to transmit a configuration message indicating that the UE is to refrain from transmitting any uplink channel repetitions when the device power level of the UE 104 falls below a predetermined threshold. The EH detection component 120 may include an EH resource component 128 configured to transmit one or more EH resources to the UE such that the UE can perform an energy harvesting operation on the one or more EH resources. The EH detection component 120 also may include an uplink channel repetition reception component 130 configured to receive a plurality of uplink channel repetition instances from the UE 104.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

The present disclosure provides for the multiplexing of UCI/uplink (UL) channels with different priorities. In some aspects, LP/HP HARQ-ACK can be multiplexed with HP/LP HARQ-ACK and/or SR, respectively. In some aspects, LP/HP or both LP+HP HARQ-ACK can be multiplexed with HP/LP PUSCH, respectively. The subject technology may support multiplexing for a number of scenarios in 5G NR technologies including, but not limited to: (1) multiplexing a high-priority HARQ-ACK and a low-priority HARQ-ACK into a PUCCH; (2) multiplexing a low-priority HARQ-ACK and a high-priority SR into a PUCCH for one or more HARQ-ACK/SR PF combinations (FFS applicable combinations); (3) multiplexing a low-priority HARQ-ACK, a high-priority HARQ-ACK and a high-priority SR into a PUCCH; (4) multiplexing a low-priority HARQ-ACK in a high-priority PUSCH (conveying UL-SCH only); (5) multiplexing a high-priority HARQ-ACK in a low-priority PUSCH (conveying UL-SCH only); (6) multiplexing a low-priority HARQ-ACK, a high-priority PUSCH conveying UL-SCH, a high-priority HARQ-ACK and/or CSI; and (7) multiplexing a high-priority HARQ-ACK, a low-priority PUSCH conveying UL-SCH, a low-priority HARQ-ACK and/or CSI. In this regard, the subject technology increases the efficiency and reliability of uplink repetition transmissions by facilitating the multiplexing of overlapped uplink repetitions with different priorities, including low priority uplink repetitions carrying HARQ-ACK information.

Figure 3:
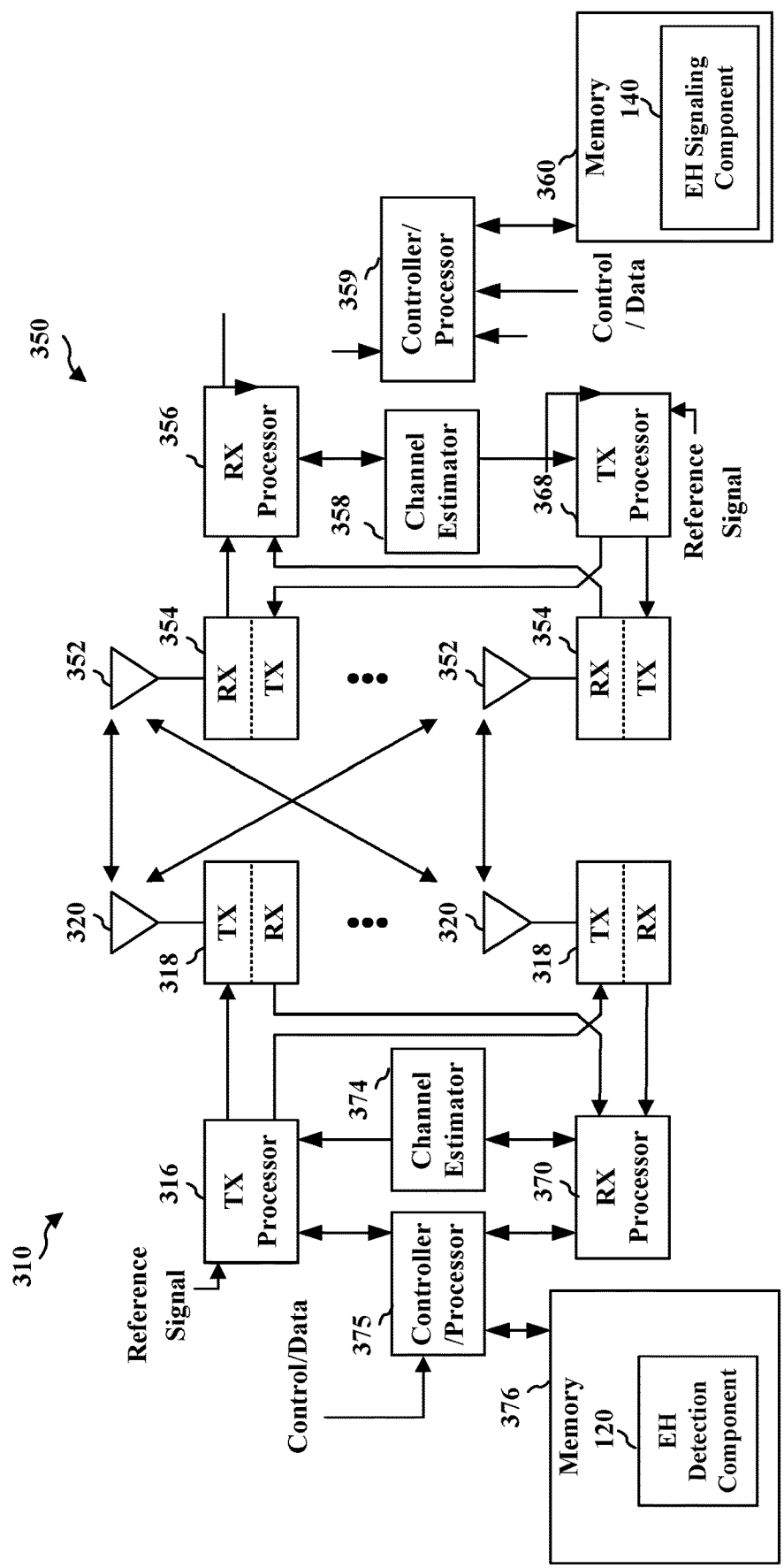
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In an aspect, the UE 350 may include a EH component 114. The EH component 114 may be a circuit configured to harvest RF energy and store the harvested energy. The EH component 114 may include an RF to DC circuit configured to convert RF energy to DC current. The EH component 114 may include a battery or capacitor for storing the harvested energy. The EH component 114 may be coupled to one or more of the antennas 352. In some implementations, the EH component 114 may include a separate antenna. The EH component 114 may be controlled by the controller/processor 359 executing the EH signaling component 140.

At least one of the TX processor 368, the RX processor 356, and the controller/processor 359 may be configured to perform aspects in connection with the EH signaling component 140 of FIG. 1. For example, the memory 360 may include executable instructions defining the EH signaling component 140. The TX processor 368, the RX processor 356, and/or the controller/processor 359 may be configured to execute the EH signaling component 140.

At least one of the TX processor 316, the RX processor 370, and the controller/processor 375 may be configured to perform aspects in connection with the EH detection component 120 of FIG. 1. For example, the memory 376 may include executable instructions defining the EH detection component 120. The TX processor 316, the RX processor 370, and/or the controller/processor 375 may be configured to execute the EH detection component 120.

Figure 4:
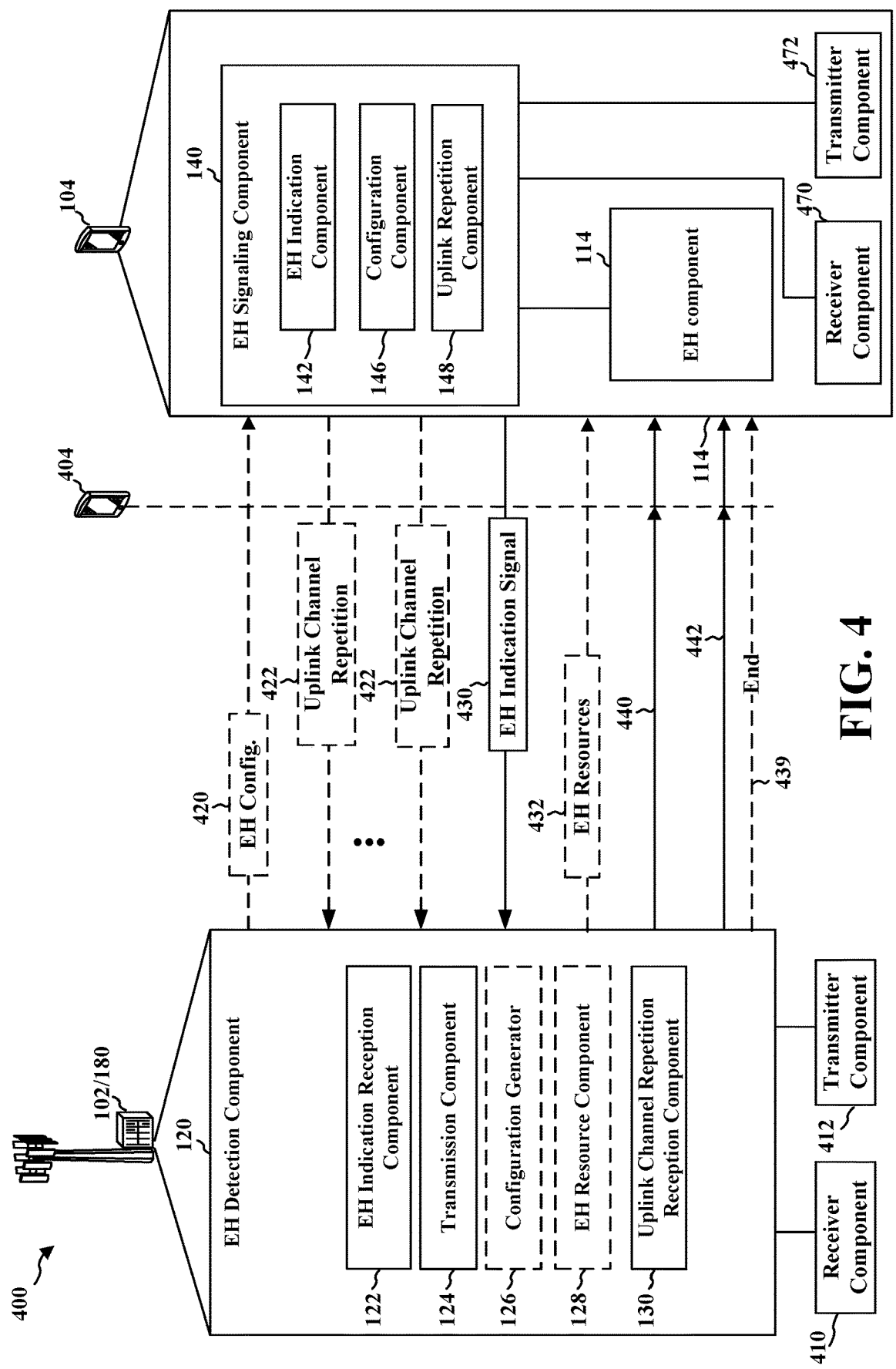
FIG. 4 is a diagram illustrating example communications and components a base station and a UE.

FIG. 4 is a diagram 400 illustrating example communications and components of a communication device 402 (e.g., a base station 102 or a UE 104) and a UE 104 configured to harvest energy. The communication device 402 includes the EH detection component 120 and the UE 104 includes the EH component 114 and the EH signaling component 140. The EH detection component 120 may be implemented by the memory 376 and the TX processor 316, the RX processor 370, and/or the controller/processor 375 of FIG. 3. For example, the memory 376 may store executable instructions defining the EH detection component 120 and the TX processor 316, the RX processor 370, and/or the controller/processor 375 may execute the instructions. The EH signaling component 140 may be implemented by the memory 360 and the TX processor 368, the RX processor 356, and/or the controller/processor 359. For example, the memory 360 may store executable instructions defining the EH signaling component 140 and the TX processor 368, the RX processor 356, and/or the controller/processor 359 may execute the instructions.

The communication device 402 may include a receiver component 410, which may include, for example, a radio frequency (RF) receiver for receiving the signals described herein. The communication device 402 may include a transmitter component 412, which may include, for example, an RF transmitter for transmitting the signals described herein. In an aspect, the receiver component 410 and the transmitter component 412 may co-located in a transceiver such as illustrated by the TX/RX 318 in FIG. 3.

As discussed briefly above with respect to FIG. 1, the EH detection component 120 may include the EH indication reception component 122 and the transmission component 124. The EH detection component 120 may optionally include the configuration generator 126, the EH resource component 128 and/or the uplink channel repetition reception component 130. The UE 104 may include a receiver component 470, which may include, for example, RF receiver for receiving the signals described herein. The UE 104 may include a transmitter component 472, which may include, for example, an RF transmitter for transmitting the signals described herein. In an aspect, the receiver component 470 and the transmitter component 472 may co-located in a transceiver such as illustrated by the TX/RX 354 in FIG. 3.

The communication device 402 may transmit an EH configuration 420. The EH configuration 420 may be, for example, an RRC configuration message. The EH configuration 420 may configure the UE 104 to refrain transmission of one or more uplink channel repetition instances in the plurality of uplink channel repetitions when a device power level associated with the UE 104 falls below a predetermined threshold. For example, the EH configuration 420 may include the predetermined threshold. The EH configuration 420 also may indicate a relationship between a number of dropped uplink channel repetition instances and a preconfigured energy harvesting rate for the UE 104. For example, the EH configuration 420 may include the preconfigured energy harvesting rate. In an aspect, the EH configuration 420 may be transmitted to the UE 104 at a time prior to transmission of the uplink channel repetitions 422 between the UE 104 and the communication device 402.

The UE 104 may transmit a plurality of uplink channel repetitions 422 to the communication 402. For example, the plurality of uplink channel repetitions 422 may be transmitted in a sequence on respective uplink resources. In an aspect, one or more of the plurality of uplink channel repetitions 422 may include a PUSCH transmission. In another aspects, one or more of the plurality of uplink channel repetitions 422 may include a PUCCH transmission.

In some examples, the UE 104 may stop transmissions of uplink channel repetition instances. In this regard, the UE 104 may transmit the EH indication signal 430. The EH indication signal 430 may indicate that the UE intends to harvest energy before resuming transmission of the number of uplink channel repetition instances. In some aspects, the indication signal may indicate that the UE modified the plurality of uplink channel repetitions by the number of uplink channel repetition instances. In some aspects, the UE 104 can transmit the indication signal to the base station in an UCI message. In some aspects, the UCI message is transmitted through a PUCCH or multiplexed onto a PUSCH. The indication signal may indicate that the UE 104 has ceased transmission of uplink channel repetitions corresponding to the number of uplink channel repetition instances. In some aspects, the indication signal indicates a bitmap of uplink resources associated with the plurality of uplink channel repetitions that are transmitted. For example, each bit location in the bitmap may correspond to a transmission status of a corresponding uplink channel repetition instance, such as a logical '1' indicating a true transmission and a logical '0' indicating a false transmission (or dropped/stopped transmission). In one or more implementations, the indication signal further indicates an adjusted number of uplink channel repetitions that the UE intends to transmit. For example, the UE 104 may indicate to the communication device 402 which uplink resources are carrying an uplink channel repetition instance, where the stopped (or dropped) uplink channel repetition instances may be on contiguous resources (e.g., consecutively) or on non-contiguous resources (e.g., every other resource). In some implementations, the indication signal further indicates that the UE 104 intends to harvest energy before resuming transmission of the number of uplink channel repetition instances.

The communication device 402 may transmit one or more EH resources based at least in part on the EH indication signal 430. For example, the communication device 402 may activate the EH resources 432 when the number of uplink channel repetition instances is reduced. In this regard, the UE 104 may perform the energy harvesting operation on the one or more energy harvest resources 432 via the EH component 114.

The communication device 402 may transmit a control channel 440 (e.g., a DCI on PDCCH). The control channel 440 may schedule a transmission such as a data channel 442 (e.g., a PDSCH or physical sidelink shared channel (PSSCH)). In an aspect, the control channel 440 may be scrambled with a RNTI for another UE 404. Accordingly, the UE 104 may not decode the control channel 440. However, based on the EH indication signal 430, the UE 104 may be aware that the base station is to transmit an RF signal and that RF energy is to be available. Accordingly, the UE 104 may harvest energy from the RF signals carrying the control channel 440 and/or the data channel 442 via the EH component 114. In some implementations, the EH resources 432 may be transmitted together with the control channel 440. In other implementations, the EH resources 432 and the control channel 440 are transmitted separately by the communication device 402.

Figure 5A:
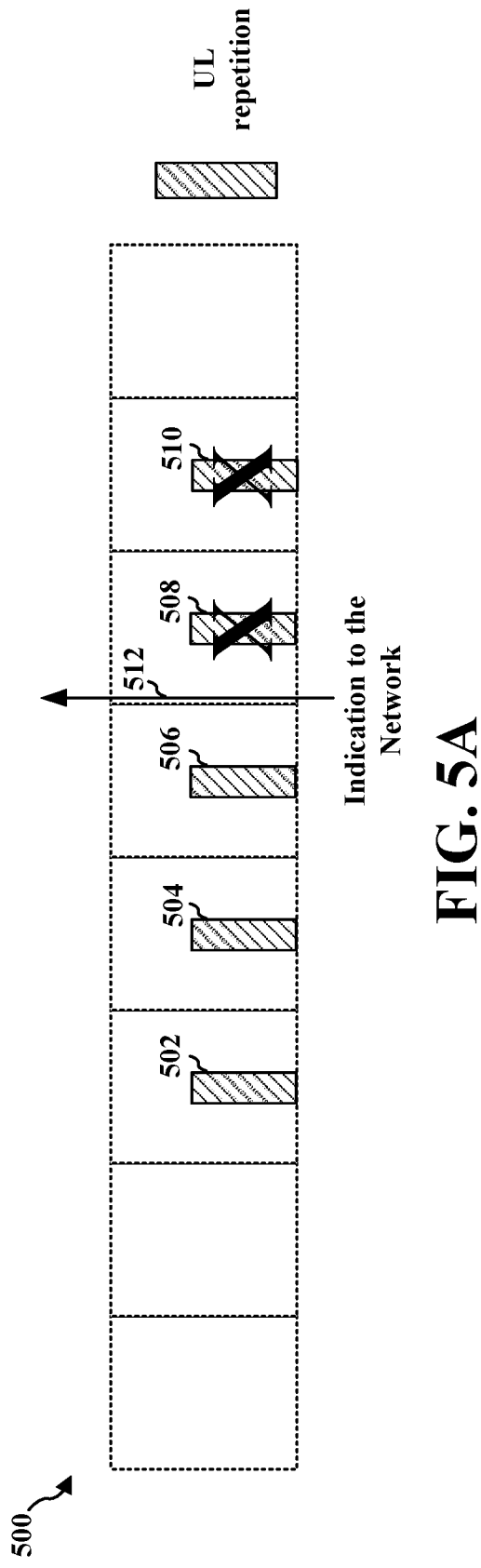
FIG. 5A is a diagram illustrating an example of uplink channel repetition transmissions including dropped uplink channel repetition instances, in accordance with some aspects of the present disclosure.

FIG. 5A is a diagram illustrating an example 500 of uplink channel repetition transmissions including dropped uplink channel repetition instances, in accordance with some aspects of the present disclosure. The example 500 includes a set of uplink channel repetition instances (e.g., 502, 504, 506, 508, 510). As illustrated in FIG. 5A, a user equipment (e.g., UE 104, 350) may transmit, to a base station, a plurality of uplink channel repetitions (e.g., 502, 504, 506). The UE 104 may monitor its device power level (e.g., battery level of the UE 104) to determine whether it has sufficient power to transmit a remaining number of uplink channel repetition instances (e.g., 508, 510) to the base station. However, the UE 104 may determine that its device power level has fallen below a predetermined threshold that corresponds to a power requirement to transmit all of the uplink channel repetition instances. In other aspects, the predetermined threshold may correspond to a power requirement to transmit the remaining number of uplink channel repetition instances (e.g., 508, 510). In this regard, the UE 104 may determine to not transmit the number of uplink channel repetition instances based on the device power level falling below the predetermined threshold. As such, the UE 104 may refrain transmission of the number of uplink channel repetition instances. As illustrated in FIG. 5A, the UE 104 stopped transmission of the uplink channel repetition instances 508 and 510. In some examples, the uplink channel repetition instances 508 and 510 may be dropped.

In some implementations, the UE 104 may transmit an indication signal 512 indicating that the UE 104 intends to harvest energy before resuming transmission of the remaining number of uplink channel repetition instances. In some implementations, the indication signal 512 may indicate that the UE modified the plurality of uplink channel repetitions by the number of uplink channel repetition instances. In some aspects, the UE 104 can transmit the indication signal 512 to the base station in a UCI message. In some aspects, the UCI message is transmitted through a PUCCH or multiplexed onto a PUSCH. In some examples, the UE 104 may stop transmissions of uplink channel repetition instances. In this regard, the indication signal 512 may indicate that the UE 104 has ceased transmission of uplink channel repetitions corresponding to the number of uplink channel repetition instances. In some aspects, the indication signal 512 indicates a bitmap of uplink resources associated with the plurality of uplink channel repetitions that are transmitted. For example, each bit location in the bitmap may correspond to a transmission status of a corresponding uplink channel repetition instance, such as a logical '1' indicating a true transmission and a logical '0' indicating a false transmission (or dropped/stopped transmission). In one or more implementations, the indication signal 512 further indicates an adjusted number of uplink channel repetitions that the UE intends to transmit. For example, the UE 104 may indicate to the network which uplink resources are carrying an uplink channel repetition instance. As illustrated in FIG. 5A, the dropped uplink channel repetition instances may be on contiguous resources (e.g., consecutive slots and/or symbols).

To increase the transmission reliability of uplink repetitions, the UE 104 may harvest energy to modify the device power level of the UE 104 to a sufficient level that allows the UE 104 to resume transmission of the uplink channel repetitions. For example, the UE 104 may harvest energy at an energy harvesting rate that can increase the device power level over time. In some examples, the uplink channel repetition instances 508 and 510 may be delayed for a fixed or variable duration (depending on the energy harvesting rate of the UE 104). In some implementations, the indication signal 512 may further indicate that the UE 104 intends to harvest energy before resuming transmission of the number of uplink channel repetition instances.

Figure 5B:
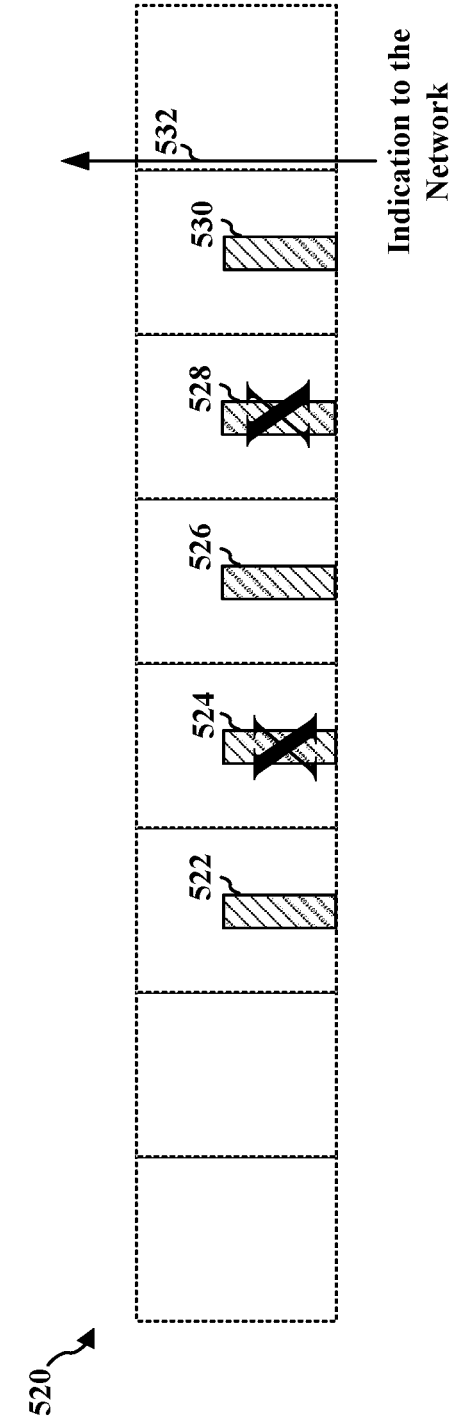
FIG. 5B is a diagram illustrating another example of uplink channel repetition transmissions including dropped uplink channel repetition instances, in accordance with some aspects of the present disclosure.

FIG. 5B is a diagram illustrating an example 520 of uplink channel repetition transmissions including dropped uplink channel repetition instances, in accordance with some aspects of the present disclosure. The example 520 includes a set of uplink channel repetition instances (e.g., 522, 524, 526, 528, 530). As illustrated in FIG. 5B, a user equipment (e.g., UE 104, 350) may transmit, to a base station, a plurality of uplink channel repetitions (e.g., 522, 526, 530). The UE 104 determines to not transmit uplink channel repetition instances 524 and 528 on non-contiguous resources. In some implementations, the UE 104 may be configured to refrain transmission of uplink channel repetitions on non-contiguous resources when the device power level falls below a predetermined threshold.

In some implementations, the UE 104 may transmit an indication signal 532 indicating that the UE 104 has refrained transmission of uplink channel repetitions 524 and 528 on non-contiguous resources. In some aspects, the UE 104 may transmit a bitmap indicating that uplink channel repetitions 522, 526 and 530 are transmitted and that uplink channel repetitions 524 and 528 are not transmitted. In some aspects, the UE 104 may indicate a new number of uplink channel repetition instances.

FIG. 6A is a diagram illustrating an example 600 of uplink channel repetition transmissions including dropped uplink channel repetition instances and an allocation of energy harvest resources, in accordance with some aspects of the present disclosure. The example 600 includes a set of uplink channel repetition instances (e.g., 602, 604, 606, 608, 610). As illustrated in FIG. 6A, a user equipment (e.g., UE 104, 350) may transmit, to a base station, a plurality of uplink channel repetitions (e.g., 602, 606, 610). The UE 104 determines to not transmit uplink channel repetition instances 604 and 608 on non-contiguous resources. In some implementations, the UE 104 may be configured to refrain transmission of uplink channel repetitions on non-contiguous resources when the device power level falls below a predetermined threshold.

In some implementations, the UE 104 may transmit, to the base station, an indication signal 612 indicating that the UE 104 has refrained transmission of uplink channel repetitions 604 and 608 on non-contiguous resources. The UE 104 may be configured with an allocation of energy harvesting resources that are activated if the number of uplink channel repetitions is reduced. For example, the base station may activate EH resources 614 when the number of uplink channel repetition instances is reduced. The UE 104 may receive EH resources 614 based at least in part on the indication signal 612. In this regard, the UE 104 may perform the energy harvesting operation on the energy harvest resources 614. The energy harvesting rate in the EH resources 614 can be determined based on a RRC configuration relating to the number of dropped uplink channel repetition transmissions and a preconfigured energy harvesting rate of the UE 104.

FIG. 6B is a diagram illustrating an example 650 of uplink channel repetition transmissions including dropped uplink channel repetition instances with multiple indication signals to a network, in accordance with some aspects of the present disclosure. The example 620 includes a set of uplink channel repetition instances (e.g., 622, 624, 626, 628, 630). As illustrated in FIG. 6B, a user equipment (e.g., UE 104, 350) may transmit, to a base station, a plurality of uplink channel repetitions (e.g., 622, 626, 630). The UE 104 determines to not transmit uplink channel repetition instances 624 and 628 when a device power level of the UE 104 is determined to not exceed a predetermined threshold. In some implementations, the UE 104 may be configured to refrain transmission of uplink channel repetitions on non-contiguous resources when the device power level falls below the predetermined threshold.

In some implementations, the UE 104 may transmit an indication signal 632 indicating that the UE 104 has refrained transmission of uplink channel repetitions 624 and 628 on non-contiguous resources. In some aspects, the UE 104 may transmit the indication signal 632 prior to a time at which a first uplink channel repetition is transmitted. In this regard, the UE 104 may provide advance notice of the uplink channel repetition instances that are transmitted and which uplink channel repetition instances are dropped and/or delayed.

In some implementations, the UE 104 may transmit an indication signal 634 indicating that the UE 104 has refrained transmission of uplink channel repetitions 624 and 628 on non-contiguous resources. In some aspects, the indication signal 634 may be transmitted at a time that is in between a transmitted uplink channel repetition (e.g., 626)

and a non-transmitted uplink channel repetition (e.g., 630). In some implementations, the UE 104 may transmit multiple indications signals (e.g., 632, 634) at different times.

Figure 7:
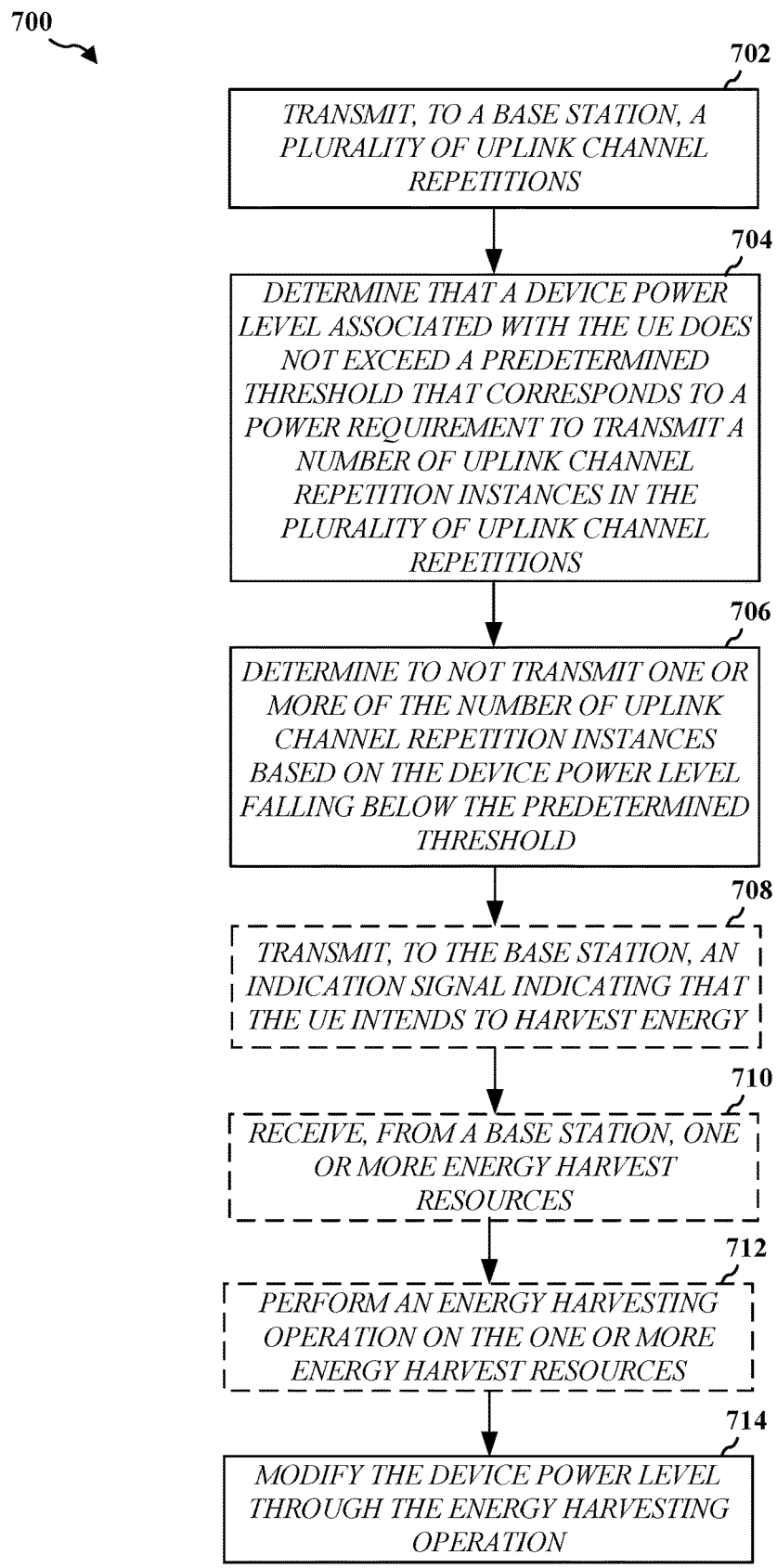
FIG. 7 is a flowchart of a process of wireless communication for autonomous physical uplink shared channel repetition cancellation at a user equipment, in accordance with some aspects of the present disclosure.

FIG. 7 is a flowchart of a process 700 of wireless communication for multiplexing of overlapped uplink channel repetition instances at a user equipment, in accordance with some aspects of the present disclosure. The process 700 may be performed by a user equipment (e.g., the UE 104, which may include the memory 360 and which may be the entire UE 104 or a component of the UE 104 such as the EH signaling component 140, the EH component 114, TX processor 368, the RX processor 356, or the controller/processor 359). The process 700 may be performed by the EH signaling component 140 in communication with the EH detection component 120 of a communication device (e.g., 102/180, 310, 402). As illustrated, the process 700 includes a number of enumerated steps, but embodiments of the process 700 may include additional steps before, after, and in between the enumerated steps. In some embodiments, one or more of the enumerated steps may be omitted or performed in a different order. Optional aspects are illustrated with a dashed line.

At 702, the UE 104 can transmit, to a base station (e.g., 102/180, 310, 402), a plurality of uplink channel repetitions. In some aspects, the plurality of uplink channel repetitions may include PUSCH repetition instances or PUCCH repetition instances. In an aspect, for example, the UE 104, the TX processor 368 and/or the controller/processor 359 may execute the EH signaling component 140 and/or the uplink repetition component 148 to transmit uplink channel repetition instances (e.g., uplink channel repetition 422). Accordingly, the UE 104, the TX processor 368, and/or the controller/processor 359 executing the EH signaling component 140 and/or the uplink repetition component 148 may provide means for transmitting a plurality of uplink channel repetitions.

At 704, the UE 104 can determine that a device power level associated with the UE does not exceed a predetermined threshold that corresponds to a power requirement to transmit a number of uplink channel repetition instances in the plurality of uplink channel repetitions. In an aspect, for example, the UE 104, the TX processor 368 and/or the controller/processor 359 may execute the EH signaling component 140 and/or the uplink repetition component 148 to determine that a device power level associated with the UE does not exceed a predetermined threshold. Accordingly, the UE 104, the TX processor 368, and/or the controller/processor 359 executing the EH signaling component 140 and/or the uplink repetition component 148 may provide means for determining that a device power level associated with the UE does not exceed a predetermined threshold that corresponds to a power requirement to transmit a number of uplink channel repetition instances in the plurality of uplink channel repetitions.

At 706, the UE 104 can determine to not transmit the number of uplink channel repetition instances based on the device power level falling below the predetermined threshold. In an aspect, for example, the UE 104, the TX processor 368 and/or the controller/processor 359 may execute the EH signaling component 140 and/or the uplink repetition component 148 to determine to not transmit the number of uplink channel repetition instances. Accordingly, the UE 104, the TX processor 368, and/or the controller/processor 359 executing the EH signaling component 140 and/or the uplink repetition component 148 may provide means for determining to not transmit the number of uplink channel repetition instances based on the device power level falling below the predetermined threshold.

In some implementations, the UE 104 can delay transmission of the number of uplink channel repetition instances. In some examples, the delay may elapse for a fixed duration of time that corresponds to an amount of time to harvest enough energy to resume the transmission of the remaining uplink channel repetition instances. In other implementations, the UE 104 can reduce a number of uplink channel repetition transmissions for transmission by the number of uplink channel repetition instances. For example, the UE 104 can determine that it may need to drop at least two uplink channel repetition instances in order to conserve (and/or harvest) that much energy to resume the transmission of the remaining (e.g., dropped) uplink channel repetition instances.

At 708, the UE 104 can transmit, to the base station, an indication signal (e.g., the EH indication signal 430) indicating that the UE intends to harvest energy before resuming transmission of the number of uplink channel repetition instances. In an aspect, for example, the UE 104, the TX processor 368 and/or the controller/processor 359 may execute the EH signaling component 140 and/or the EH indicator generator 142 to transmit, to the base station, an indication signal (e.g., EH indication signal 430) indicating that the UE intends to harvest energy before resuming transmission of the number of uplink channel repetition instances. Accordingly, the UE 104, the TX processor 368, and/or the controller/processor 359 executing the EH signaling component 140 and/or the EH indicator generator 142 may provide means for transmitting an indication signal indicating that the UE intends to harvest energy.

In some implementations, the UE 104 can transmit, to the base station, an indication signal indicating that the UE modified the plurality of uplink channel repetitions by the number of uplink channel repetition instances. In some aspects, the UE 104 can transmit the indication signal to the base station in a UCI message. In some aspects, the UCI message is transmitted through a PUCCH or multiplexed onto a PUSCH. In some examples, the UE 104 may stop transmissions of uplink channel repetition instances. In this regard, the indication signal may indicate that the UE 104 has ceased transmission of uplink channel repetitions corresponding to the number of uplink channel repetition instances. In some aspects, the indication signal indicates a bitmap of uplink resources associated with the plurality of uplink channel repetitions that are transmitted. For example, each bit location in the bitmap may correspond to a transmission status of a corresponding uplink channel repetition instance, such as a logical '1' indicating a true transmission and a logical '0' indicating a false transmission (or dropped/stopped transmission). In one or more implementations, the indication signal further indicates an adjusted number of uplink channel repetitions that the UE intends to transmit. For example, the UE 104 may indicate to the network which uplink resources are carrying an uplink channel repetition instance, where the stopped (or dropped) uplink channel repetition instances may be on contiguous resources (e.g., consecutively) or on non-contiguous resources (e.g., every other resource).

In some implementations, the indication signal further indicates that the UE 104 intends to harvest energy before resuming transmission of the number of uplink channel repetition instances.

At 710, the UE 104 receive, from the base station, one or more energy harvest resources based at least in part on the indication signal. In an aspect, for example, the UE 104, the RX processor 356 and/or the controller/processor 359 may execute the EH signaling component 140 and/or the EH component 114 to receive, from the base station, one or more energy harvest resources (e.g., EH resources 432) based at least in part on the indication signal (e.g., EH indication signal 430). Accordingly, the UE 104, the TX processor 368, and/or the controller/processor 359 executing the EH signaling component 140 and/or the EH component 140 may provide means for receiving one or more energy harvest resources based at least in part on the indication signal.

At 712, the UE 104 can perform the energy harvesting operation on the one or more energy harvest resources. In an aspect, for example, the UE 104 and/or the controller/processor 359 may execute the EH component 114 to perform the energy harvesting operation on the one or more energy harvest resources. Accordingly, the UE 104, the TX processor 368, and/or the controller/processor 359 executing the EH signaling component 140 and/or the EH component 140 may provide means for performing the energy harvesting operation on the one or more energy harvest resources. In some aspects, the UE 104 can perform the energy harvesting operation following cessation of the transmission of the number of uplink channel repetition instances.

At 714, the UE 104 can modify the device power level through the energy harvesting operation. In an aspect, for example, the UE 104, the controller/processor 359 may execute the EH signaling component 140 and/or the EH component 114 to modify the device power level through an energy harvesting operation. Accordingly, the UE 104 and/or the controller/processor 359 executing the EH signaling component 140 and/or the EH component 114 may provide means for modifying the device power level through an energy harvesting operation.

In some implementations, the UE 104 can resume the transmission of the number of uplink channel repetition instances after the energy harvesting operation.

In some implementations, the UE 104 can receive a RRC configuration that configures the UE to refrain transmission of one or more uplink channel repetition instances in the plurality of uplink channel repetitions when the device power level falls below the predetermined threshold. In some aspects, the RRC configuration comprises the predetermined threshold. In some aspects, the RRC configuration also indicates a relationship between a number of dropped uplink channel repetition instances and a preconfigured energy harvesting rate for the UE. In some implementations, the UE 104 can determine to drop the number of uplink channel repetition instances from transmission based on the preconfigured energy harvesting rate. In some aspects, the energy harvesting operation is performed according to the preconfigured energy harvesting rate.

Figure 8:
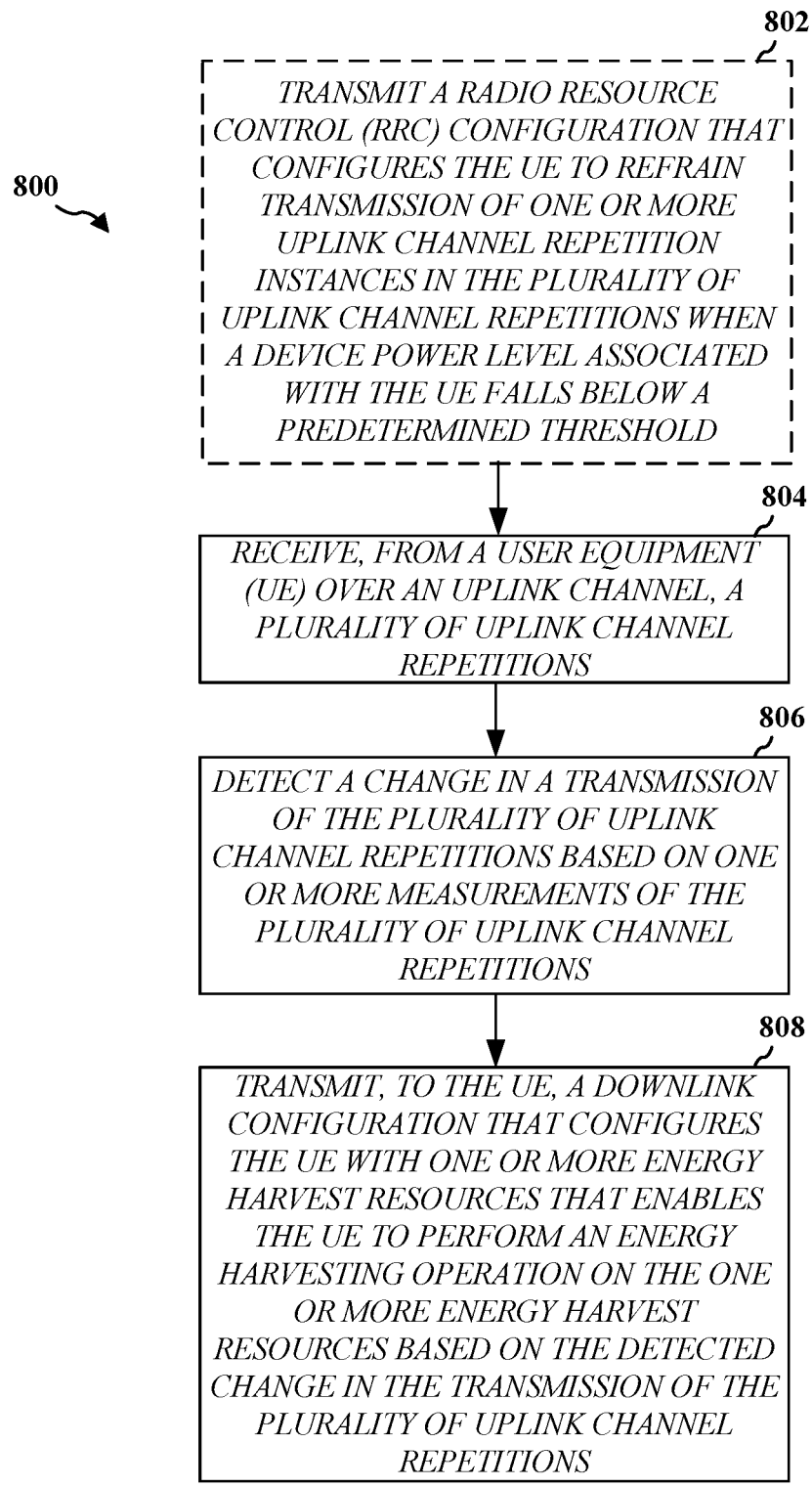
FIG. 8 is a flowchart of a process of wireless communication for autonomous physical uplink shared channel repetition cancellation at a base station, in accordance with some aspects of the present disclosure.

FIG. 8 is a flowchart of a process 800 of wireless communication for multiplexing of overlapped uplink channel repetition instances at a user equipment, in accordance with some aspects of the present disclosure. The process 800 may be performed by a base station (e.g., such as the receiving device 502, the receiving device 702, the base station 102, or a UE 104, which may include the memory 376 and which may be the entire transmitting device 502 or a component of the transmitting device 502 such as the EF signaling component 120, TX processor 316, the RX processor 370, or the controller/processor 375). The process 800 may be performed by the EH detection component 120 in communication with the EH signaling component 140 of the UE 104. As illustrated, the process 800 includes a number of enumerated steps, but embodiments of the process 800 may include additional steps before, after, and in between the enumerated steps. In some embodiments, one or more of the enumerated steps may be omitted or performed in a different order. Optional aspects are illustrated with a dashed line.

At 802, the base station can transmit, to the UE, a RRC configuration that configures the UE to refrain transmission of one or more uplink channel repetition instances in the plurality of uplink channel repetitions when a device power level associated with the UE falls below a predetermined threshold. In some aspects, the RRC configuration comprises the predetermined threshold. In an aspect, for example, the base station, the controller/processor 375, and/or the TX processor 316 may execute the EH detection component 120 and/or the configuration generator 126 to transmit the RRC configuration that configures the UE to refrain transmission of one or more uplink channel repetition instances in the plurality of uplink channel repetitions. Accordingly, the base station, the controller/processor 375, and/or the TX processor 316 executing the EH detection component 120 and/or the configuration generator 126 may provide means for transmitting a RRC configuration that configures the UE to refrain transmission of one or more uplink channel repetition instances in the plurality of uplink channel repetitions when a device power level associated with the UE falls below a predetermined threshold.

At 804, the base station can receive, from a user equipment (e.g., the), a plurality of uplink channel repetitions. In an aspect, for example, the base station, the controller/processor 375, and/or the RX processor 370 may execute the EH detection component 120 and/or the uplink channel repetition reception component 150 to receive the plurality of uplink channel repetitions (e.g., uplink channel repetitions 422). Accordingly, the base station, the controller/processor 375, and/or the RX processor 370 executing the EH detection component 120 and/or the uplink channel repetition reception component 150 may provide means for receiving the plurality of uplink channel repetitions.

At 806, the base station can detect a change in a transmission of the plurality of uplink channel repetitions based on one or more measurements of the plurality of uplink channel repetitions. In an aspect, for example, the base station, the controller/processor 375, and/or the TX processor 316 may execute the EH detection component 120 and/or the configuration generator 126 to transmit the RRC configuration that configures the UE to refrain transmission of one or more uplink channel repetition instances in the plurality of uplink channel repetitions. Accordingly, the base station, the controller/processor 375, and/or the RX processor 370 executing the EH detection component 120 and/or the configuration generator 126 may provide means for transmitting a RRC configuration that configures the UE to refrain transmission of one or more uplink channel repetition instances in the plurality of uplink channel repetitions when a device power level associated with the UE falls below a predetermined threshold.

In some implementations, the base station may obtain the one or more measurements indicating variations in energy from one or more beams originating from a direction of the UE. The base station can detect a decrease in a number of uplink channel repetition instances from the one or more measurements of the plurality of uplink channel repetitions.

In other implementations, the base station may perform a correlation between a first transmission associated with a first uplink channel repetition instance and a second transmission associated with a second uplink channel repetition instance from the one or more measurements. In this regard, the base station can detect a decrease in a number of uplink channel repetition instances from the correlation. Given that a decrease in the uplink channel repetitions has been detected, the base station can conclude that the UE 104 has stopped transmissions in uplink channel repetitions and has entered a mode to perform energy harvesting operations.

At 808, the base station can transmit, to the UE 104, a downlink configuration that configures the UE with one or more energy harvest resources that enables the UE to perform an energy harvesting operation on the one or more energy harvest resources based on the detected change in the transmission of the plurality of uplink channel repetitions. In an aspect, for example, the base station, the controller/processor 375, and/or the TX processor 316 may execute the EH detection component 120 and/or the configuration generator 126 to transmit the downlink configuration that configures the UE with one or more energy harvest resources that enables the UE to perform an energy harvesting operation on the one or more energy harvest resources. Accordingly, the base station, the controller/processor 375, and/or the RX processor 370 executing the EH detection component 120 and/or the configuration generator 126 may provide means for transmitting the downlink configuration that configures the UE with one or more energy harvest resources that enables the UE to perform an energy harvesting operation on the one or more energy harvest resources based on the detected change in the transmission of the plurality of uplink channel repetitions.

Figure 9:
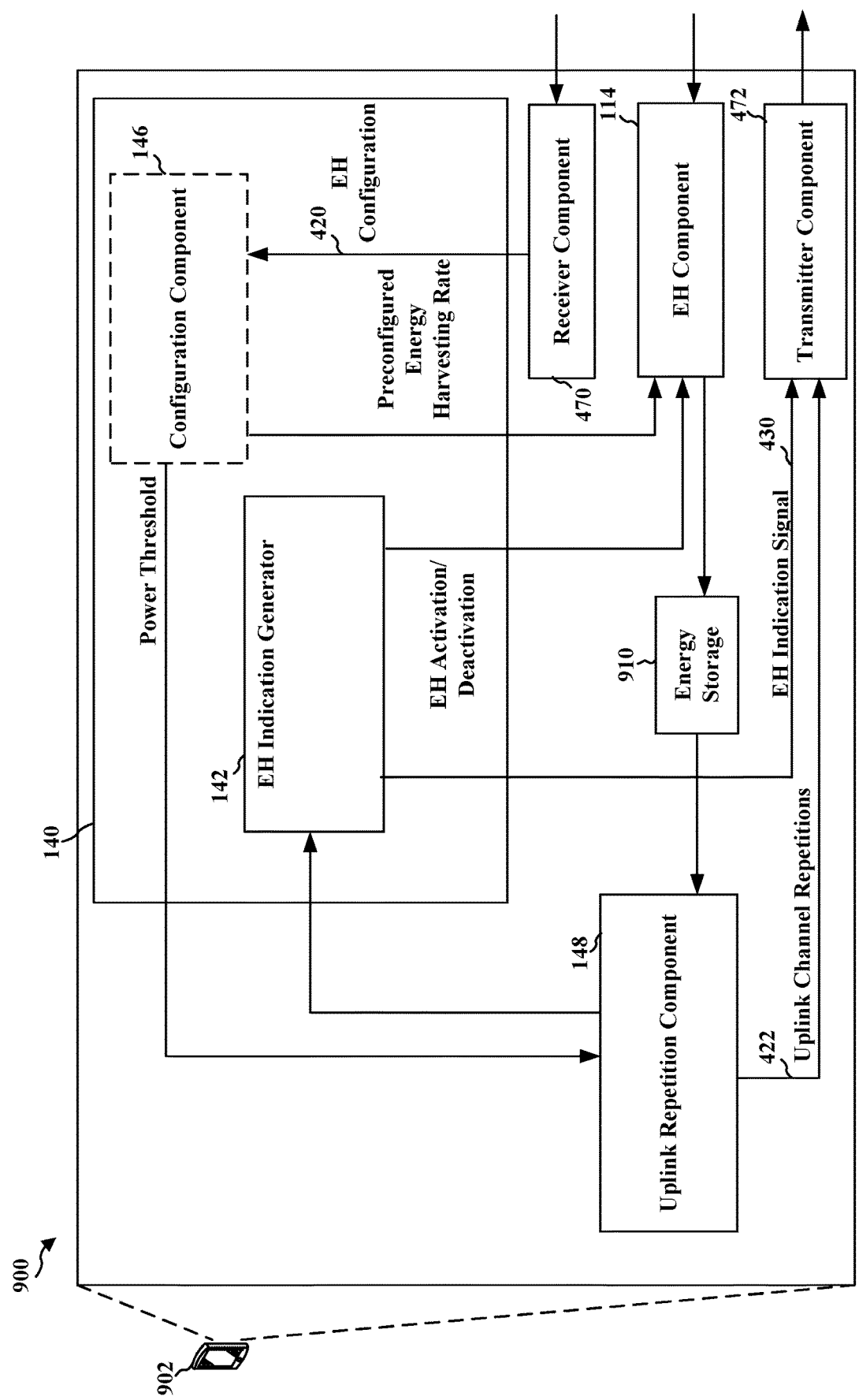
FIG. 9 is a conceptual data flow diagram 900 illustrating the data flow between different means/components in an example UE.

FIG. 9 is a conceptual data flow diagram 900 illustrating the data flow between different means/components in an example UE 902, which may be an example of the UE 104 (or UE 350) including the EH signaling component 140 and the EH component 114 with reference to FIGS. 1, 3, and 4.

The receiver component 470 may receive various signals including the EH configuration 420. The receiver component 470 may provide the EH configuration 420 to the configuration component 146.

The configuration component 146 may receive the EH configuration 420 via the receiver component 470. For example, the EH configuration 420 may be a RRC configuration message. The EH configuration 420 may be, for example, an RRC configuration message. The EH configuration 420 may configure the UE 104 to refrain transmission of one or more uplink channel repetition instances in the plurality of uplink channel repetitions when a device power level associated with the UE 104 falls below a predetermined threshold. For example, the EH configuration 420 may include the predetermined threshold. The EH configuration 420 also may indicate a relationship between a number of dropped uplink channel repetition instances and a preconfigured energy harvesting rate for the UE 104. For example, the EH configuration 420 may include the preconfigured energy harvesting rate. In an aspect, the EH configuration 420 may be transmitted to the UE 104 at a time prior to transmission of the uplink channel repetitions 422 between the UE 104 and the communication device 402. The configuration component 146 may provide a predetermined power threshold to the uplink repetition component 148. The predetermined power threshold may correspond to a power requirement to transmit a number of uplink channel repetition instances in the uplink channel repetitions 422. The configuration component 146 also may provide a preconfigured energy harvesting rate that represents a charging rate for harvesting energy at the UE 104.

The uplink repetition component 148 may generate and transmit a plurality of uplink channel repetitions via the transmitter component 472. The uplink repetition component 148 may provide an indication of the uplink channel repetition instances to the EH indicator generator 142. The uplink repetition component 148 may monitor a device power level and determine whether the device power level associated with the UE does not exceed the predetermined power threshold. The uplink repetition component 148 may determine that the device power level associated with the UE 104 does not exceed a predetermined threshold, and determine to not transmit the number of uplink channel repetition instances based on the device power level falling below the predetermined power threshold. The uplink repetition component 148 may provide an indication of such device power level detection to the EH indicator generator 142. The uplink repetition component 148 may refrain transmission of the number of uplink channel repetition instances. The energy storage 910 may provide an indication of the device power level to the uplink repetition component 148.

The EH indication generator 142 may provide the EH indication signal 430 to the transmitter component 472. The EH indication generator 142 may transmit the EH indication signal 430 via the transmitter component 472. The EH indication generator 142 may generate the indication signal 430 with a bitmap of uplink resources associated with the plurality of uplink channel repetitions that are transmitted.

The EH component 114 may receive a control signal (e.g., activation or deactivation) from the EH indication generator 142. The EH component 114 may receive an indication of the preconfigured energy harvesting rate from the configuration component 146. The configuration component 146 also may provide the EH component 114 with a relationship between a number of dropped uplink channel repetition instances and the preconfigured energy harvesting rate for the UE 104. For example, if the preconfigured energy harvesting rate indicates that the UE 104 requires an energy harvesting rate of 0.5, the UE 104 would need to drop two uplink channel repetition instances. If the UE 104 requires a higher energy harvesting rate, the UE 104 may need to drop additional uplink channel repetition transmissions. When activated, the EH component 114 may harvest energy from RF signals according to the preconfigured energy harvesting rate. The EH component 114 may charge the energy storage 910 with the harvested energy. The other components of the UE 104 (e.g., receiver component 470, transmitter component 472) may draw energy from the energy storage 910.

Figure 10:
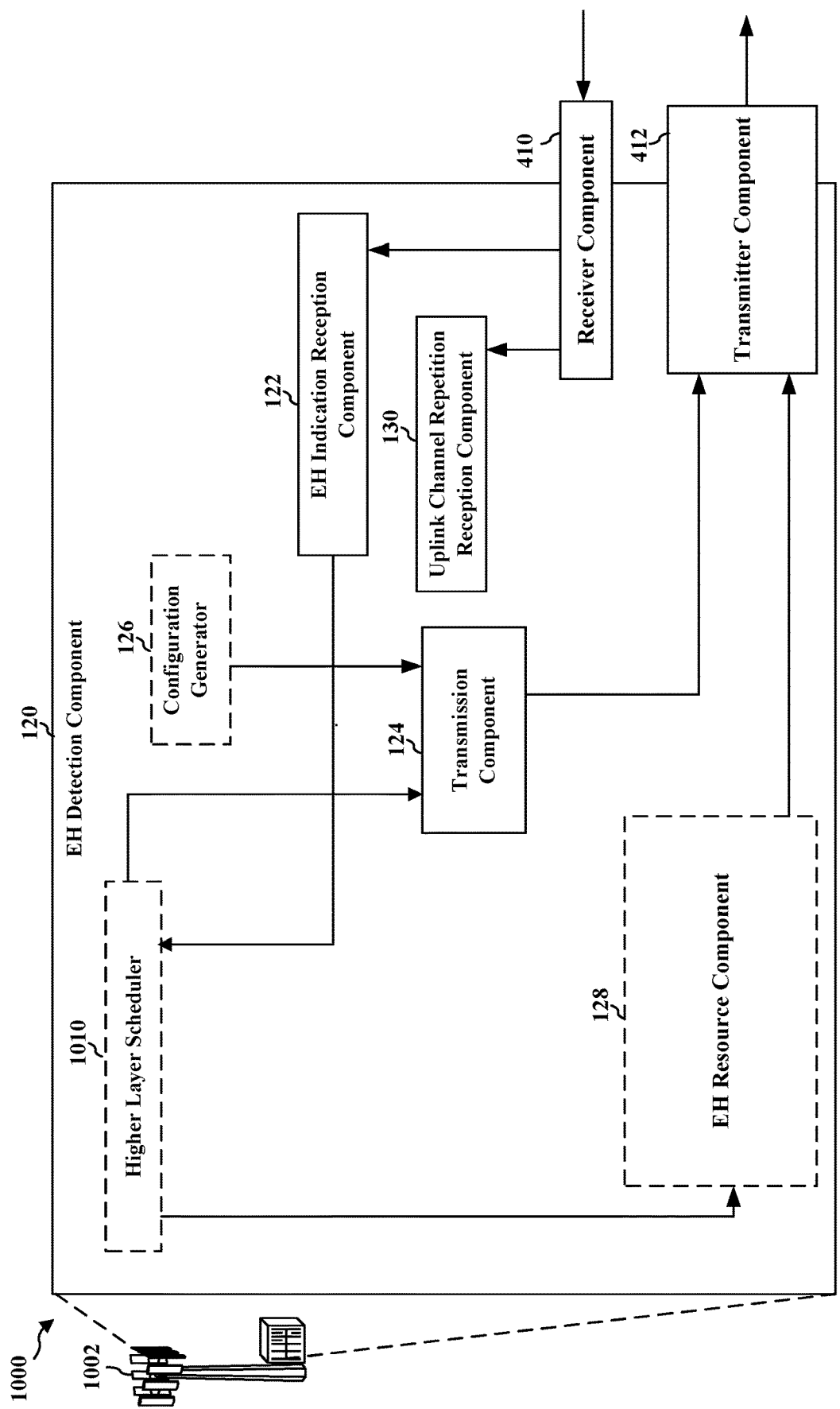
FIG. 10 is a conceptual data flow diagram 1000 illustrating the data flow between different means/components in an example communication device.

FIG. 10 is a conceptual data flow diagram 1000 illustrating the data flow between different means/components in an example communication device 1002, which may be an example of the base station 102, the base station 310, or the communication device 402 and include the EH detection component 120 with reference to FIGS. 1, 3, and 4. In some implementations, the communication device 1002 may be a UE including the EH detection component 120.

The EH detection component 120 may include a higher layer scheduler 1010 that determines transmissions for one or more UEs. The higher layer scheduler 1010 may provide scheduling information to the EH resource component 128 and the transmission component 124.

The uplink channel repetition reception component 130 may receive a plurality of uplink channel repetitions from the UE 104 via the reception component 410.

The EH indication reception component 122 may receive an indication signal from the UE 104 via the reception component 410. The indication signal may be an explicit indication that the UE has stopped transmission of a number of uplink channel repetition instances. In some aspects, the indication signal also may indicate that the UE 104 intends to harvest energy before resuming transmission of a remaining number of uplink channel repetition instances. In other implementations, the EH indication reception component 130 may detect a change in a transmission of the plurality of uplink channel repetitions based on one or more measurements of the plurality of uplink channel repetitions. For example, the EH indication reception component 122 may receive (and/or process) one or more measurements indicating variations in energy from one or more beams originating from a direction of the UE 104, and detect a decrease in a number of uplink channel repetition instances from the one or more measurements of the plurality of uplink channel repetitions. In other implementations, the EH indication reception component 122 may perform a correlation between a first transmission associated with a first uplink channel repetition instance and a second transmission associated with a second uplink channel repetition instance from the one or more measurements, and further detect a decrease in a number of uplink channel repetition instances from the correlation. For example, the EH indication reception component 122 may determine that the first and second uplink channel repetition transmissions occurred if the correlation between them is high (e.g., a correlation value exceeds a correlation threshold). In another example, the EH indication reception component 122 may determine that the second uplink channel repetition transmission did not occur if the correlation between the first and second uplink channel repetition transmissions is low (e.g., a correlation value does not exceed the correlation threshold).

The EH resource component 128 may receive scheduling information for one or more UEs from the higher layer scheduler 1010. The EH resource component 128 may determine a time period when RF energy is available at the UE 104 based on the scheduling information. The RF energy may be a transmission to any UE, not just the UE 104 that is to harvest the energy. The EH resource component 128 may provide EH resources 432 to the UE 104 via the transmitter component 412. For example, the EH resource component 128 may indicate which resources (of RF signals) from which to harvest energy. The EH resources 432 may be transmitted in response to receiving the EH indication signal 430 at the EH indication reception component 122 (or implicitly detecting the stopped and/or dropped uplink channel repetition instances) in some implementations, or the EH resources 432 may be transmitted independently of any indication of stopped and/or dropped uplink channel repetition instances from the UE 104.

The transmission component 448 may receive the scheduling information from the higher layer scheduler 1010. The transmission component 448 may transmit RF signals based on the scheduling information to the UE or another UE. For example, the RF signals may include the control channel 440 and the data channel 442. The transmission component 448 may transmit the RF signals via the transmitter component 412. In some implementations, the transmission component 448 may boost a transmission power of the RF signals during a time period to improve energy harvesting at the UE 104.

In some implementations, the configuration generator 126 may generate the EH configuration 420. For example, the configuration generator 126 may generate the EH configuration 420 for a particular UE based on reported capabilities of the UE. Where the EH configuration 420 is an RRC message, the configuration generator 126 may provide the EH configuration 420 to the transmission component 124 for inclusion in a data channel 442 and transmission via the transmitter component 412. The EH configuration 420 may configure the UE 104 to refrain transmission of one or more uplink channel repetition instances in the plurality of uplink channel repetitions when a device power level associated with the UE 104 falls below a predetermined threshold. For example, the EH configuration 420 may include the predetermined threshold. The EH configuration 420 may include a preconfigured energy harvesting rate that represents a charging rate for harvesting energy at the UE 104. For example, the EH configuration 420 may indicate a relationship between a number of dropped uplink channel repetition instances and the preconfigured energy harvesting rate for the UE 104. In an aspect, the EH configuration 420 may be transmitted to the UE 104 at a time prior to receiving the uplink channel repetitions at the communication device 402.

Figure 11A:
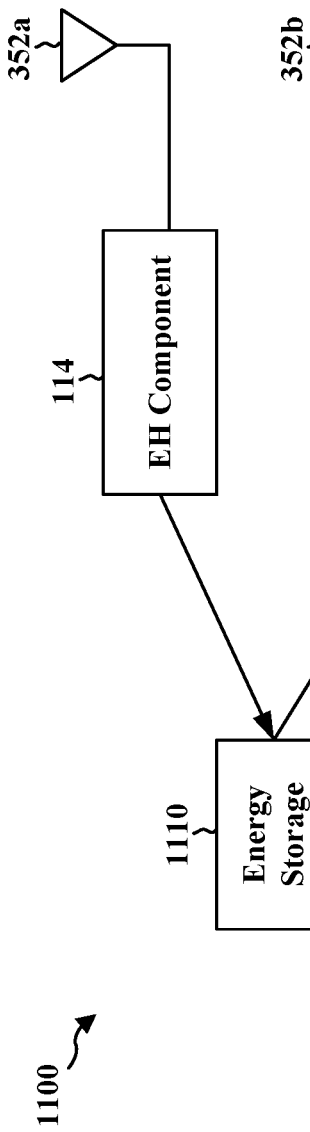
FIG. 11A is a schematic diagram illustrating a first example hardware architecture for energy harvesting.

FIG. 11A is a schematic diagram illustrating a first example hardware architecture 1100 for energy harvesting. The architecture 1100 may include separate antennas 352a and 352b for energy harvesting and communications. The antenna 352a may be connected to the EH component 114. The antenna 352b may be connected to a communication component 1120. The communication component 1120 may include, for example, one or more transceivers (e.g., RX/TX 354), the channel estimator 358, the RX processor 356, and the Tx processor 368. The EH component 114 may be connected to an energy storage 1110, which may include, for example, a capacitor and/or a battery. The EH component 114 may charge the energy storage 1110 with energy harvested from RF signals received via the antenna 352a. The energy storage 1110 may provide energy to the communication component 1120.

Figure 11B:
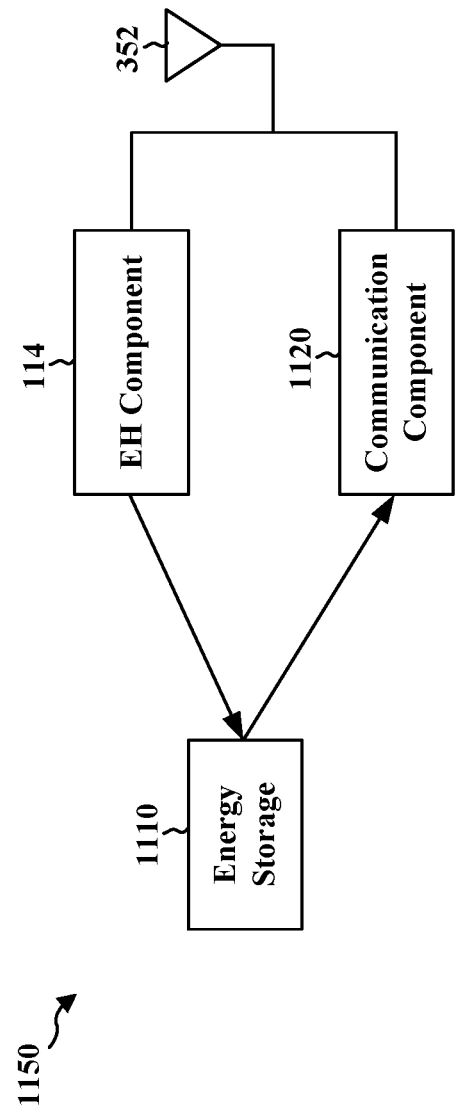
FIG. 11B is a schematic diagram illustrating a second example hardware architecture for energy harvesting.

FIG. 11B is a schematic diagram illustrating a second example hardware architecture 1150 for energy harvesting. The architecture 1150 may include a shared antenna 352 for energy harvesting and communications. Energy received on the antenna 352 may be shared between the EH component 114 and the communication component 1120. As in the architecture 1100, the EH component 114 may be connected to an energy storage 1110 and charge the energy storage 1110 with energy harvested from RF signals received via the antenna 352. The energy storage 1110 may provide energy to the communication component 1120 (e.g., for processing the received RF signals or transmitting RF signals).

Figure 12A:
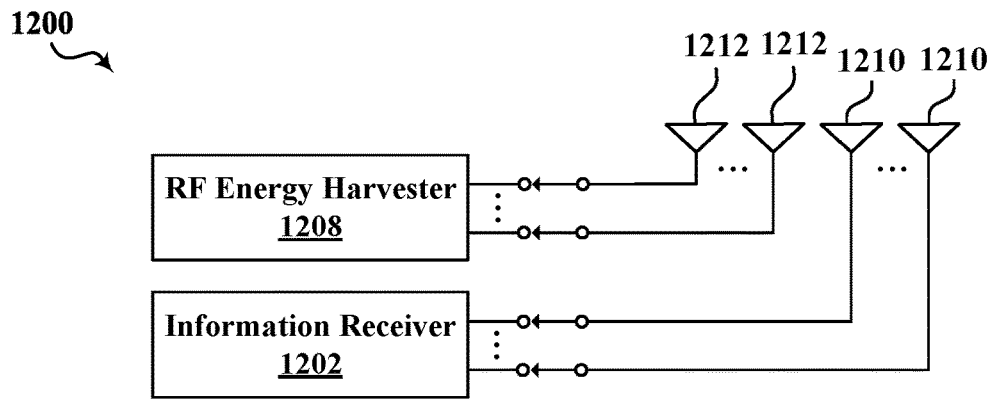
FIGS. 12A-12C are block diagrams of example EH schemes, according to aspects of the present disclosure.
Figure 12B:
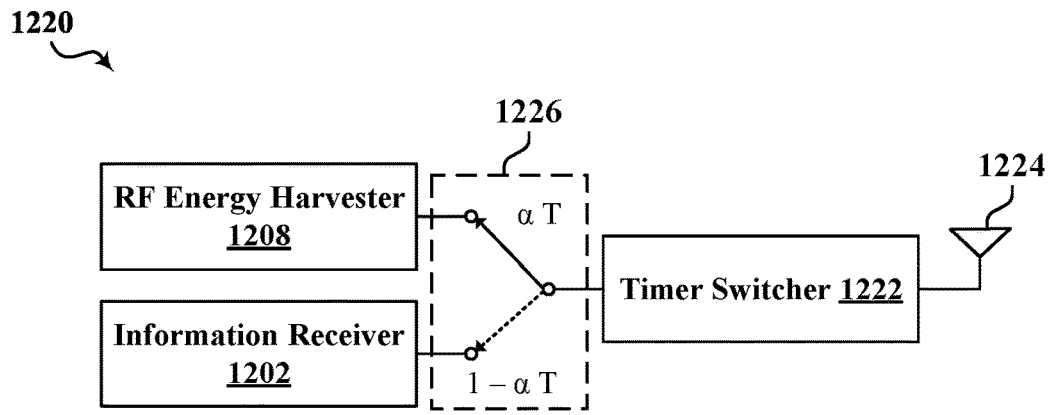
Figure 12C:
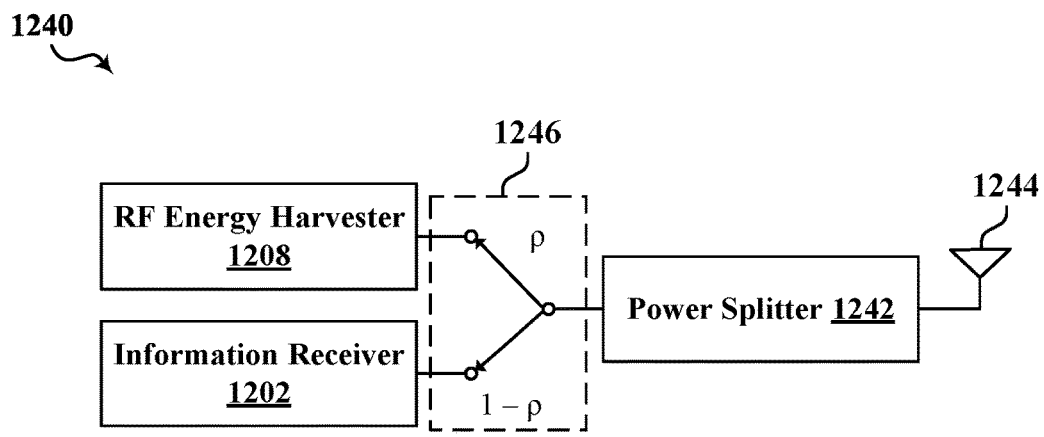

Referring to FIGS. 12A-12C, three types of EH techniques (or architectures or schemes) are conventionally used—a separated receiver architecture 1200 of FIG. 12A, a time-switching architecture 1220 of FIG. 12B, and a power-splitting architecture 1240 of FIG. 12C. Referring to FIG. 12A, the separated receiver architecture 1200 implements the RF EH 1208 using separate antennas 1212 from antennas 1210 used by an information receiver 1202.

Referring to FIG. 12B, in the time-switching architecture 1220, a time switcher 1222 controls a switch 1226 to switch received RF signals from an antenna 1224 between the information receiver 1202 and the RF energy harvester 408. In an example, the energy harvested at a receiver j from source i can be calculated as follows:

$$E_j = \eta P_i |g_{i-j}|^2 \alpha T,$$

where $0 \leq \alpha \leq 1$ is the fraction of time allocated for energy harvesting. Letting $\kappa$ and W denote the noise spectral density and channel bandwidth, the data rate R is given by:

$$R_{i-j} = (1-\alpha)\log_2\left(1 + \frac{|g_{i-j}|^2 P_i}{\kappa W}\right).$$

Referring to FIG. 12C, in the power-splitting architecture 1240, a power splitter 1242 controls a splitter 1246 to split received RF signals from antenna 1244 into two streams for the information receiver 1202 and the RF energy harvester 408 with different power levels. For example, the energy harvested at receiver j from source i can be calculated as follows:

$$E_j = \eta P_i |g_{i\text{-}j}|^2 \alpha T,$$

where $0 \leq \alpha \leq 1$ is the fraction of power allocated for energy harvesting. The data rate R is given by:

$$R_{i\text{-}j} = \log_2\left(1 + \frac{|g_{i\text{-}j}|^2(1-\rho)P_i}{\kappa W}\right).$$

Figure 13:
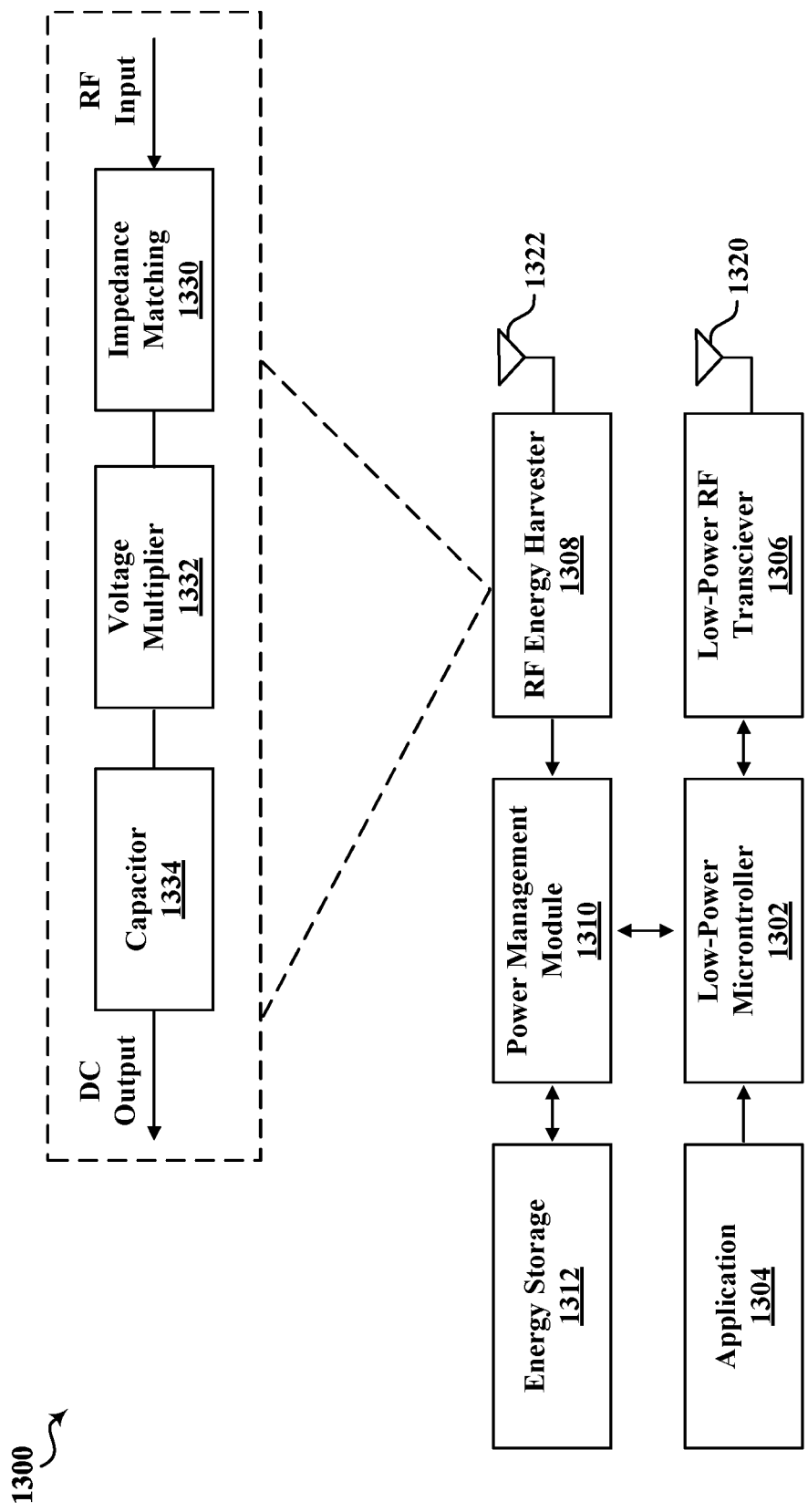
FIG. 13 is a block diagram of example components for an energy harvesting node, according to aspects of the present disclosure.

Referring to FIG. 13, an RF EH node 1300 may include a low-power microcontroller 1302 to process data including data received from other devices and/or instructions from an application 1304, a low-power RF transceiver 1306 for information transmission or reception via an antenna 1320, an energy harvester 1308 to collect RF signals via an RF antenna 1322 and convert them into electricity. To convert the signals into energy, the energy harvester 1308 may receive an RF input via the antenna 1322 which is passed through, for example, an impedance matching component 1330, a voltage multiplier 1332, and a capacitor 1334, and provide a direct current (DC) output to a power management module 1310, which decides whether to store the electricity obtained from the RF energy harvester 1308 or to use the electricity for information transmission immediately or store the electricity in an energy storage 1312 (e.g., battery).

Figure 14A:
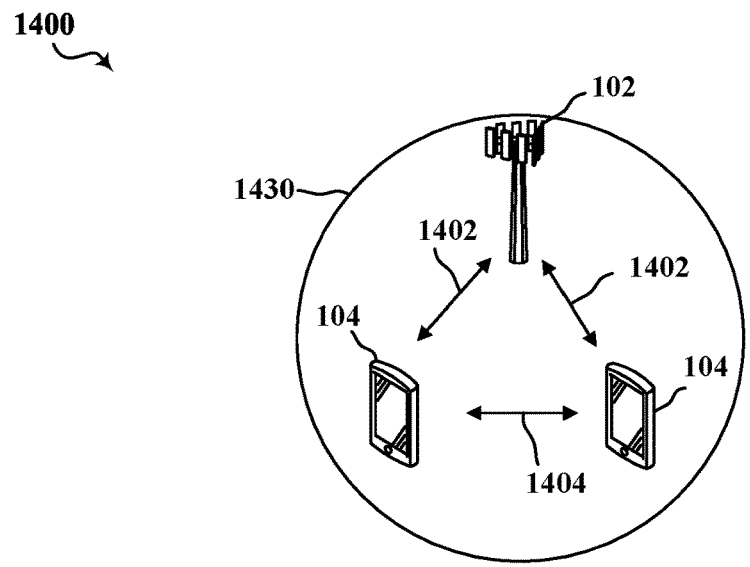
FIGS. 14A-14C are block diagrams of example communication coverage schemes, according to aspects of the present disclosure.
Figure 14B:
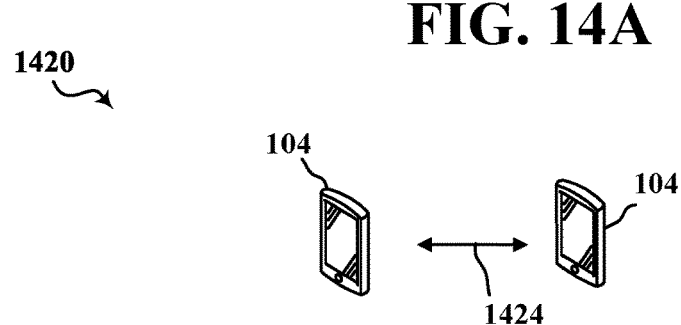
Figure 14C:
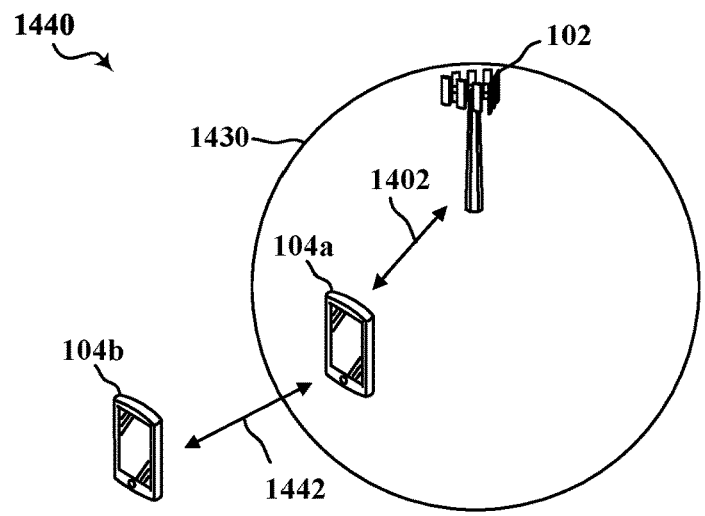

Referring to FIGS. 14A-14C, coverage scenarios may include an in-coverage scenario 1400 of FIG. 14A, an out-of-coverage scenario 1420 of FIG. 14B, or a partial coverage scenario 1440 of FIG. 14C. Referring to FIG. 14A, in the in-coverage scenario 1400, sidelink (SL) UEs 104 within the coverage area 1430 of the base station 102 may individually communicatively couple to 5GC (not shown; see e.g., Core Network 190 of FIG. 1) via a Uu link 1402 (e.g., any communication link between SL UE 104 and base station 102), and the SL UEs 104 may communicatively couple with each other via a SL 1404 (e.g., direct communication link between the UEs 104). In this example, SL authorization and provisioning via the Uu link 1402 may be necessary to support SL operations. Further, the base station 102 may control SL discovery/communication resource allocations for the UEs 104.

Referring to FIG. 14B, in the out-of-coverage scenario 1420, the SL UEs 104 may communicatively communicate via a SL 1424 and may not communicatively couple to 5GC. In an example, the SL UEs 104 may operate without authorization and provisioning via a Uu link. Instead, the SL UEs 104 may be pre-configured with SL provisioning information for discovery/communication support.

Referring to FIG. 14C, in the partial coverage scenario 1440, a first UE 104a may be within the coverage area 1430 of the base station 102 and therefore may be communicatively coupled to 5GC via the Uu link 1402. A second UE 104b may or may not be communicatively coupled to 5GC. In an example, the second UE 104b may communicatively couple to 5GC via the first UE 104a and a SL 1442 using, for example, a relay operation. In this example, both authorization/provisioning via the Uu link 1402 and pre-configured SL provisioning may be possible.

Figure 15A:
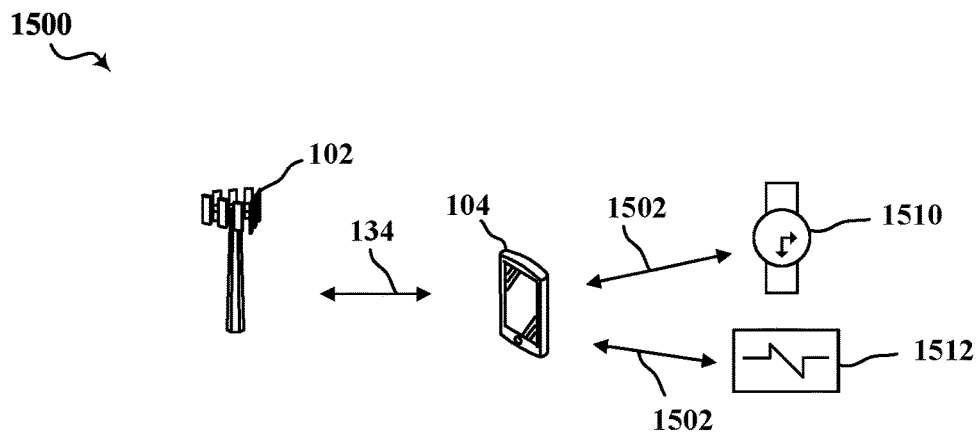
FIGS. 15A-15C are block diagrams of example wearable communication schemes, according to aspects of the present disclosure.
Figure 15B:
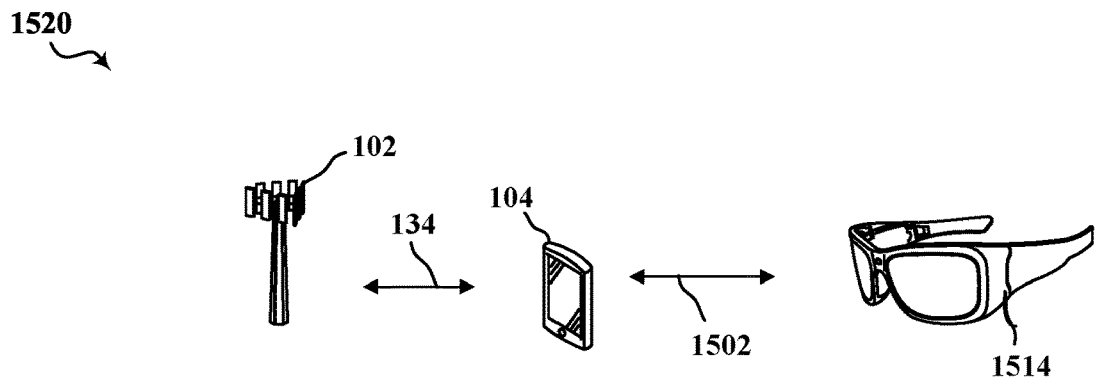
Figure 15C:
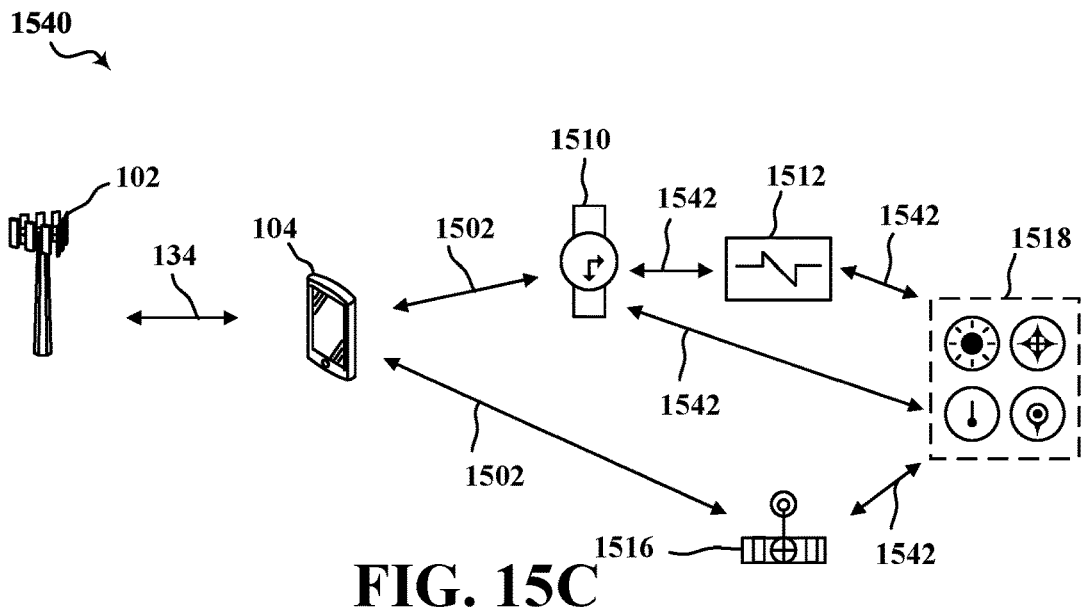

Referring to FIGS. 15A-15C, some UEs 104 may include wearables or other internet-of things (IoT) devices that tend to be low powered devices. Wearables may include, but are not limited to, smartwatches 1510, health monitoring devices 1512, head mounted displays (HMD) devices 1514, or sensors 1516 (including, e.g., appliances 1518), and may have different communication scenarios than described by FIGS. 14A-14C. For example, in a first scenario 1500 of FIG. 15A, the smartwatch 1510 (with/without 5G modem) and/or the health monitoring device 1512 may communicatively couple to the UE 104 via any type of SL 1502 and the UE 104 may communicatively couple to the base station 102 via the Uu link 134. In this example, these wearables operate via SL only, and the UE 104 performs a UE-to-NW relay operation. Similarly, for the second scenario 1520 of FIG. 15B, the HIVID device 1512 may communicatively couple to the UE 104 via the SL 1502 for an SL only operation, and the UE 104 performs a UE-to-NW relay operation with the base station 102 via the Uu link 134.

In a third scenario 1540 of FIG. 15C, the sensors 1516 may communicate with the UE 104 via the SL 1502 using a SL only operation while the UE 104 communicates with the base station 102 via the Uu link 134 using a UE-to-NW relay operation. Further, in this example, the sensors 1516 may communicate among themselves via, for example mesh (UE-to-UE relay) over SL 1542. For example, the smart home appliances 1518 (e.g., smart thermostat or entry key) may communicate via the mesh over SL 1542 with the health monitor device 1512, the smartwatch 1510, and/or the sensors 1516.

Based on these different scenarios, RF energy-harvesting may prolong battery lifetime of UEs and/or wearables. For example, wirelessly powering-devices may be used as incentives for devices to help each other. a UE that is configured to transmit PUSCH with multiple repetitions may be in a state that does not permit all these transmissions due to power requirements. The UE may need to reduce the number of repetitions to save energy, and by halting these PUSCH repetitions, the UE can harvest energy at a charging rate and form an indication of energy harvesting to the network.

In the present disclosure, techniques for autonomous cancellation of PUSCH repetitions depending on associated uplink power requirements are presented, including, for example, novel methods for stopping uplink repetition transmissions and harvesting energy, UE power conservation and efficiency based on these energy harvesting techniques, and designs for explicit and implicit uplink repetition transmission indications to a network.

In the present disclosure, techniques for receiver power splitting are presented, including, for example, designs for joint long-term and short-term power splitting coefficients, novel methods for controlling energy, UE capabilities base on these techniques, and reporting to base stations.

The following clauses are illustrative only and may be combined with aspects of other embodiments or teachings described herein, without limitation.

Clause 1 is an apparatus for wireless communication at a user equipment (UE), the apparatus comprising transmit, to a base station, a plurality of uplink channel repetitions; determine that a device power level associated with the UE does not exceed a predetermined threshold that corresponds to a power requirement to transmit a number of uplink channel repetition instances in the plurality of uplink channel repetitions; determine to not transmit the number of uplink channel repetition instances based on the device power level falling below the predetermined threshold; and modify the device power level through an energy harvesting operation.

In Clause 2, the apparatus of clause 1 further includes that, when the instructions are executed by the at least one processor, further cause the apparatus to delay transmission of the number of uplink channel repetition instances.

In Clause 3, the apparatus of any of clauses 1 or 2 further includes that, when the instructions are executed by the at least one processor, further cause the apparatus to reduce a number of uplink channel repetition transmissions for transmission by the number of uplink channel repetition instances.

In Clause 4, the apparatus of any of clauses 1-3 further includes, when the instructions are executed by the at least one processor, further cause the apparatus to transmit, to the base station, an indication signal indicating that the UE modified the plurality of uplink channel repetitions by the number of uplink channel repetition instances.

In Clause 5, the apparatus of clause 4 further includes that the indication signal indicates a bitmap of uplink resources associated with the plurality of uplink channel repetitions that are transmitted.

In Clause 6, the apparatus of clause 4 further includes that the indication signal further indicates that the UE has ceased transmission of uplink channel repetitions corresponding to the number of uplink channel repetition instances.

In Clause 7, the apparatus of clause 4 further includes that the indication signal further indicates an adjusted number of uplink channel repetitions that the UE intends to transmit.

In Clause 8, the apparatus of clause 4 further includes that the indication signal is transmitted to the base station in an uplink control information (UCI) message, wherein the UCI message is transmitted through a physical uplink control channel (PUCCH) or multiplexed onto a physical uplink shared channel (PUSCH).

In Clause 9, the apparatus of clause 4 further includes that the indication signal further indicates that the UE intends to harvest energy before resuming transmission of the number of uplink channel repetition instances.

In Clause 10, the apparatus of clause 9 further includes that, when the instructions are executed by the at least one processor, further cause the apparatus to receive, from the base station, one or more energy harvest resources based at least in part on the indication signal; and perform the energy harvesting operation on the one or more energy harvest resources.

In Clause 11, the apparatus of any of clauses 1-10 further includes that, when the instructions are executed by the at least one processor, further cause the apparatus to refrain transmission of the number of uplink channel repetition instances; and perform an energy harvesting operation following cessation of the transmission of the number of uplink channel repetition instances.

In Clause 12, the apparatus of clause 11 further includes that, when the instructions are executed by the at least one processor, further cause the apparatus to resume the transmission of the number of uplink channel repetition instances after the energy harvesting operation.

In Clause 13, the apparatus of any of clauses 1-12 further includes that, when the instructions are executed by the at least one processor, further cause the apparatus to receive a radio resource control (RRC) configuration that configures the UE to refrain transmission of one or more uplink channel repetition instances in the plurality of uplink channel repetitions when the device power level falls below the predetermined threshold.

In Clause 14, the apparatus of clause 13 further includes that the RRC configuration comprises the predetermined threshold.

In Clause 15, the apparatus of clause 13 further includes that the RRC configuration indicates a relationship between a number of dropped uplink channel repetition instances and a preconfigured energy harvesting rate for the UE.

In Clause 16, the apparatus of clause 15 further includes that, when the instructions are executed by the at least one processor, further cause the apparatus to determine to drop the number of uplink channel repetition instances from transmission based on the preconfigured energy harvesting rate.

In Clause 17, the apparatus of clause 15 further includes that the energy harvesting operation is performed according to the preconfigured energy harvesting rate.

Clause 18 is a device including one or more processors and one or more memories in electronic communication with the one or more processors storing instructions executable by the one or more processors to cause the system or to implement a method that realizes the apparatus as in any of Clauses 1 to 17.

Clause 19 is a system or apparatus including means for implementing a method or realizing the apparatus as in any of Clauses 1 to 17.

Clause 20 is a non-transitory computer readable medium storing instructions executable by one or more processors to cause the one or more processors to realize the apparatus as in any of Clauses 1 to 17.

Clause 21 is an apparatus for wireless communication at a base station, the apparatus comprising receive, from a user equipment (UE), a plurality of uplink channel repetitions; detect a change in a transmission of the plurality of uplink channel repetitions based on an indication associated with at least a portion of the plurality of uplink channel repetitions; and transmit, to the UE, a downlink configuration that configures the UE with one or more energy harvest resources that enables the UE to perform an energy harvesting operation on the one or more energy harvest resources based on the detected change in the transmission of the plurality of uplink channel repetitions.

In Clause 22, the apparatus of clause 21 further includes that, when the instructions are executed by the at least one processor, further cause the apparatus to obtain one or more measurements indicating variations in energy from one or more beams originating from a direction of the UE; and determine the indication implicitly by detecting a decrease in a number of uplink channel repetition instances from the one or more measurements of the plurality of uplink channel repetitions.

In Clause 23, the apparatus of any of clauses 21 or 22 further includes that, when the instructions are executed by the at least one processor, further cause the apparatus to obtain one or more measurements of the plurality of uplink channel repetitions; perform a correlation between a first transmission associated with a first uplink channel repetition instance and a second transmission associated with a second uplink channel repetition instance from the one or more measurements; and determine the indication implicitly by detecting a decrease in a number of uplink channel repetition instances from the correlation.

In Clause 24, the apparatus of any of clauses 21 or 22 further includes that, when the instructions are executed by the at least one processor, further cause the apparatus to transmit, to the UE, a radio resource control (RRC) configuration that configures the UE to refrain transmission of one or more uplink channel repetition instances in the plurality of uplink channel repetitions when a device power level associated with the UE falls below a predetermined threshold, wherein the RRC configuration comprises the predetermined threshold.

In Clause 25, the apparatus of any of clauses 21 or 22 further includes that, when the instructions are executed by the at least one processor, further cause the apparatus to determine the indication explicitly by receiving, from the UE, an indication signal indicating that the UE stopped transmission of a number of uplink channel repetition instances in the plurality of uplink channel repetitions.

Clause 26 is a device including one or more processors and one or more memories in electronic communication with the one or more processors storing instructions executable by the one or more processors to cause the system or to implement a method that realizes the apparatus as in any of Clauses 21 to 25.

Clause 27 is a system or apparatus including means for implementing a method or realizing the apparatus as in any of Clauses 21 to 25.

Clause 28 is a non-transitory computer readable medium storing instructions executable by one or more processors to cause the one or more processors to realize the apparatus as in any of Clauses 21 to 25.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more.". Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration.". Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means.". As such, no claim element is to be construed as a means plus function unless the element is expressly recited using the phrase "means for.".

What is claimed is:

1. An apparatus for wireless communication at a user equipment (UE), the apparatus comprising:
   a transceiver;
   at least one processor; and
   at least one memory coupled to the transceiver and the at least one processor, the at least one memory having instructions stored thereon which when executed by the at least one processor, individually or in any combination, cause the apparatus to:
   transmit, to a base station, one or more uplink channel repetitions of a plurality of uplink channel repetition instances; and
   refrain from transmitting one or more remaining uplink channel repetitions of the plurality of uplink channel repetition instances in response to a device power level associated with the UE falling below a predetermined threshold corresponding to a power requirement to transmit the one or more remaining uplink channel repetitions.

2. The apparatus of claim 1, wherein, when the instructions are executed by the at least one processor, the instructions further cause the apparatus to delay transmission of the one or more remaining uplink channel repetitions.

3. The apparatus of claim 1, wherein, when the instructions are executed by the at least one processor, the instructions further cause the apparatus to reduce a number of the plurality of uplink channel repetition instances for transmission by a number of uplink channel repetition instances the one or more remaining uplink channel repetitions.

4. The apparatus of claim 1, wherein, when the instructions are executed by the at least one processor, the instructions further cause the apparatus to transmit, to the base station, an indication signal indicating that the UE modified the plurality of uplink channel repetition instances by a number of the one or more remaining uplink channel repetitions.

5. The apparatus of claim 4, wherein the indication signal indicates a bitmap of uplink resources associated with the plurality of uplink channel repetition instances.

6. The apparatus of claim 4, wherein the indication signal further indicates that the UE has ceased transmission of the one or more remaining uplink channel repetitions.

7. The apparatus of claim 4, wherein the indication signal further indicates an adjusted number of uplink channel repetitions that the UE intends to transmit.

8. The apparatus of claim 4, wherein the indication signal is transmitted to the base station in an uplink control information (UCI) message, wherein the UCI message is transmitted through a physical uplink control channel (PUCCH) or multiplexed onto a physical uplink shared channel (PUSCH).

9. The apparatus of claim 4, wherein the indication signal further indicates that the UE intends to harvest energy before resuming transmission of the one or more remaining uplink channel repetitions.

10. The apparatus of claim 9, wherein, when the instructions are executed by the at least one processor, the instructions further cause the apparatus to:
receive, from the base station, one or more radio frequency (RF) signals in energy harvest resources based at least in part on the indication signal; and
modify the device power level through an energy harvesting operation on the one or more RF signals in the energy harvest resources.

11. The apparatus of claim 1, wherein, when the instructions are executed by the at least one processor, the instructions further cause the apparatus to:
perform an energy harvesting operation following cessation of transmission of the one or more remaining uplink channel repetitions.

12. The apparatus of claim 11, wherein, when the instructions are executed by the at least one processor, the instructions further cause the apparatus to resume the transmission of the one or more remaining uplink channel repetitions after the energy harvesting operation.

13. The apparatus of claim 1, wherein, when the instructions are executed by the at least one processor, the instructions further cause the apparatus to receive a radio resource control (RRC) configuration that configures the UE to refrain transmission of the one or more remaining uplink channel repetitions in response to the device power level falling below the predetermined threshold.

14. The apparatus of claim 13, wherein the RRC configuration includes the predetermined threshold.

15. The apparatus of claim 13, wherein the RRC configuration indicates a relationship between a number of dropped uplink channel repetition instances and a preconfigured energy harvesting rate for the UE.

16. The apparatus of claim 15, wherein, when the instructions are executed by the at least one processor, the instructions further cause the apparatus to determine to drop the one or more remaining uplink channel repetitions from transmission based on the preconfigured energy harvesting rate.

17. The apparatus of claim 15, wherein, when the instructions are executed by the at least one processor, the instructions further cause the apparatus to:
modify the device power level through an energy harvesting operation performed according to the preconfigured energy harvesting rate.

18. A method of wireless communication at a user equipment (UE), the method comprising:
transmitting, to a base station, one or more uplink channel repetitions of a plurality of uplink channel repetition instances; and
refraining from transmitting one or more remaining uplink channel repetitions of the plurality of uplink channel repetition instances in response to a device power level associated with the UE falling below a predetermined threshold corresponding to a power requirement to transmit the one or more remaining uplink channel repetitions.

19. The method of claim 18, further comprising delaying transmission of the one or more remaining uplink channel repetitions.

20. The method of claim 18, further comprising reducing a number of the plurality of uplink channel repetition instances for transmission by a number of the one or more remaining uplink channel repetitions.

21. The method of claim 18, further comprising:
transmitting, to the base station, an indication signal indicating that the UE modified the plurality of uplink channel repetition instances by a number of the one or more remaining uplink channel repetitions;
receiving, from the base station, one or more radio frequency (RF) signals in energy harvest resources based at least in part on the indication signal; and
modifying the device power level through an energy harvesting operation on the one or more RF signals in the energy harvest resources.

22. The method of claim 18, further comprising:
performing an energy harvesting operation following cessation of transmission of the one or more remaining uplink channel repetitions; and
resuming the transmission of the one or more remaining uplink channel repetitions after the energy harvesting operation.

23. The method of claim 18, further comprising:
receiving a radio resource control (RRC) configuration that configures the UE to refrain transmission of the one or more remaining uplink channel repetitions in response to the device power level falling below the predetermined threshold, wherein the RRC configuration indicates a relationship between a number of dropped uplink channel repetition instances and a preconfigured energy harvesting rate for the UE; and
determining to drop the one or more remaining uplink channel repetitions from transmission based on the preconfigured energy harvesting rate.

24. An apparatus for wireless communication at a base station, the apparatus comprising:
a transceiver;
at least one processor; and
at least one memory coupled to the transceiver and the at least one processor, the at least one memory having instructions stored thereon which when executed by the at least one processor, individually or in any combination, cause the apparatus to:
receive, from a user equipment (UE), one or more uplink channel repetitions of a plurality of uplink channel repetition instances;
determine an indication of a refrained UE transmission of one or more remaining uplink channel repetitions of the plurality of uplink channel repetition instances, the refrained UE transmission being in response to a device power level associated with the UE falling below a predetermined threshold corresponding to a power requirement for the UE to transmit the one or more remaining uplink channel repetitions; and
transmit, to the UE, a downlink configuration based on the indication that configures the UE with one or more energy harvest resources for the UE to perform an energy harvesting operation associated with the one or more energy harvest resources.

25. The apparatus of claim 24, wherein, when the instructions are executed by the at least one processor, the instructions further cause the apparatus to:
obtain one or more measurements indicating variations in energy from one or more beams originating from a direction of the UE; and
determine the indication implicitly in response to a detection of a decrease in a number of uplink channel repetition instances from the one or more measurements.

26. The apparatus of claim 24, wherein, when the instructions are executed by the at least one processor, the instructions further cause the apparatus to:
- obtain one or more measurements of the plurality of uplink channel repetition instances;
- determine a correlation between a first transmission associated with a first uplink channel repetition instance and a second refrained transmission associated with a second uplink channel repetition instance from the one or more measurements; and
- determine the indication implicitly in response to a detection of a decrease in a number of uplink channel repetition instances from the correlation.

27. The apparatus of claim 24, wherein, when the instructions are executed by the at least one processor, the instructions further cause the apparatus to:
- determine the indication explicitly in response to reception, from the UE, of an indication signal indicating that the UE stopped transmission of the one or more remaining uplink channel repetitions.

28. A method of wireless communication at a base station, the method comprising:
- receiving, from a user equipment (UE), one or more uplink channel repetitions of a plurality of uplink channel repetition instances;
- determining an indication of a refrained UE transmission of one or more remaining uplink channel repetitions of the plurality of uplink channel repetition instances, the refrained UE transmission being in response to a device power level associated with the UE falling below a predetermined threshold corresponding to a power requirement for the UE to transmit the one or more remaining uplink channel repetitions; and
- transmitting, to the UE, a downlink configuration based on the indication that configures the UE with one or more energy harvest resources for the UE to perform an energy harvesting operation associated with the one or more energy harvest resources.

29. The method of claim 28, further comprising:
- obtaining one or more measurements indicating variations in energy from one or more beams originating from a direction of the UE; and
- determining the indication implicitly in response to a detection of a decrease in a number of uplink channel repetition instances from the one or more measurements.

30. The method of claim 28, further comprising:
- obtaining one or more measurements of the plurality of uplink channel repetition instances;
- determining a correlation between a first transmission associated with a first uplink channel repetition instance and a second refrained transmission associated with a second uplink channel repetition instance from the one or more measurements; and
- determining the indication implicitly in response to a detection of a decrease in a number of uplink channel repetition instances from the correlation.

* * * * *